(12) United States Patent
Choi et al.

(10) Patent No.: US 10,443,924 B2
(45) Date of Patent: Oct. 15, 2019

(54) REFRIGERATOR

(71) Applicant: LG ELECTRONICS INC., Seoul (KR)

(72) Inventors: Daejin Choi, Seoul (KR); Hyehyun Sim, Seoul (KR); Jongpil Kim, Seoul (KR); Yongwoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/763,916

(22) PCT Filed: Oct. 4, 2016

(86) PCT No.: PCT/KR2016/011083
§ 371 (c)(1),
(2) Date: Mar. 28, 2018

(87) PCT Pub. No.: WO2017/057998
PCT Pub. Date: Apr. 6, 2017

(65) Prior Publication Data
US 2018/0283071 A1 Oct. 4, 2018

(30) Foreign Application Priority Data

Oct. 2, 2015 (KR) .................. 10-2015-0138979

(51) Int. Cl.
*F25D 23/02* (2006.01)
*F16H 19/04* (2006.01)
(Continued)

(52) U.S. Cl.
CPC ....... *F25D 23/025* (2013.01); *E05D 15/0686* (2013.01); *E05F 1/16* (2013.01);
(Continued)

(58) Field of Classification Search
CPC ...... F25D 23/02; F25D 23/021; F25D 23/025; F25D 23/04; F25D 23/12; F25D 23/062; F25D 23/069; F25D 25/00; F25D 2400/04
See application file for complete search history.

(56) References Cited

U.S. PATENT DOCUMENTS

| 788,856 A | 5/1905 | Stafford | |
|---|---|---|---|
| 2,235,454 A * | 3/1941 | Koropchak | F25D 23/025 160/37 |

(Continued)

FOREIGN PATENT DOCUMENTS

| DE | 102012216907 A1 * | 3/2014 | ............ F25D 23/04 |
|---|---|---|---|
| DE | 102013203724 A1 * | 9/2014 | ............ F25D 11/006 |

(Continued)

OTHER PUBLICATIONS

International Search Report and Written Opinion dated Jan. 2, 2017 issued in Application No. PCT/KR2016/011083 (with English translation).

(Continued)

*Primary Examiner* — Andrew M Roersma
(74) *Attorney, Agent, or Firm* — Ked & Associates, LLP

(57) ABSTRACT

A refrigerator may include a partition wall that isolate a first storage compartment from a second storage compartment. A third storage compartment is provided in the partition wall to be recessed downwards from an upper surface of the partition wall. An opening is formed on the upper surface to allow storage objects to be placed into the storage space. A door covers the opening of the third storage compartment and is configured to be moved in a direction parallel to the upper surface of the partition wall to selectively open or close the opening. An elastic-force assembly may apply a restoring force to the door when the door is moved to open the third storage compartment. A slide assembly that guides movement of the door may include a speed dampener that reduces a speed of the door when the door is moved to close the third storage compartment.

20 Claims, 11 Drawing Sheets

(51) Int. Cl.
  *F25D 25/00* (2006.01)
  *E05D 15/06* (2006.01)
  *E05F 1/16* (2006.01)
  *E05F 5/00* (2017.01)
  *F25D 23/06* (2006.01)

(52) U.S. Cl.
  CPC ............ *E05F 5/003* (2013.01); *F16H 19/04* (2013.01); *F25D 23/021* (2013.01); *F25D 23/069* (2013.01); *F25D 25/00* (2013.01); *E05Y 2201/26* (2013.01); *E05Y 2201/264* (2013.01); *E05Y 2201/684* (2013.01); *E05Y 2900/31* (2013.01)

(56) References Cited

U.S. PATENT DOCUMENTS

| | | | | |
|---|---|---|---|---|
| 2,711,944 | A * | 6/1955 | Meek | F25D 25/025 292/18 |
| 5,199,777 | A * | 4/1993 | Taima | B60R 7/06 312/319.1 |
| 5,303,995 | A * | 4/1994 | Kurihara | B60R 7/04 312/319.1 |
| 6,846,053 | B2 * | 1/2005 | Salice | E05F 5/027 312/334.14 |
| 8,936,332 | B2 | 1/2015 | Park et al. | |
| 2007/0262686 | A1 * | 11/2007 | Ji | A47B 88/00 312/402 |
| 2008/0047295 | A1 * | 2/2008 | Kim | A47B 96/06 62/441 |
| 2011/0095670 | A1 * | 4/2011 | Cho | F25D 25/025 312/405.1 |
| 2015/0241117 | A1 * | 8/2015 | Burke | F25D 23/065 312/404 |
| 2016/0282036 | A1 * | 9/2016 | Lee | F25D 23/069 |

FOREIGN PATENT DOCUMENTS

| | | | | |
|---|---|---|---|---|
| EP | 2594877 | A2 * | 5/2013 | .......... F25D 23/069 |
| JP | 02037276 | A * | 2/1990 | |
| JP | 2000-180042 | | 6/2000 | |
| JP | 2006-138487 | | 6/2006 | |
| KR | 10-1999-0053424 | | 7/1999 | |
| KR | 10-2005-0072298 | | 7/2005 | |
| KR | 10-2005-0105342 | | 11/2005 | |
| KR | 10-2008-0012685 | | 2/2008 | |
| KR | 10-2010-0028841 | | 3/2010 | |
| KR | 10-2011-0042362 | | 4/2011 | |
| KR | 10-2011-0046237 | | 5/2011 | |
| KR | 10-2013-0011827 | | 1/2013 | |
| WO | WO 2014/201615 | | 12/2014 | |
| WO | WO 2015/072591 | | 5/2015 | |

OTHER PUBLICATIONS

European Search Report dated May 15, 2019 issued in EP Application No. 16852144.1.

European Search Report dated May 16, 2019 issued in Application No. 16852141.7.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2016/011083, filed Oct. 4, 2016, which claims priority to Korean Patent Application No. 10-2015-0138979, filed Oct. 2, 2015, whose entire disclosures are hereby incorporated by reference.

TECHNICAL FIELD

The present invention relates to a refrigerator, and more particularly to a receiving unit configured to efficiently utilize space for storing objects to be refrigerated or frozen and a structure of a door for opening and closing the receiving unit.

BACKGROUND ART

A refrigerator is an apparatus for storing storage objects (objects to be refrigerated or frozen) received in a storage space in a refrigerated or frozen state through a cycle constituted by compression, condensation, expansion and evaporation of refrigerant. In other words, a conventional refrigerator is provided with a storage space for receiving storage objects and a heat exchange unit for absorbing heat from the air in the storage space so as to maintain the storage objects disposed in the storage space at a temperature lower than the ambient temperature.

Because the volume of the storage space is restricted by the storage capacity set for the refrigerator, designing the storage space to be efficiently utilized is one of the critical factors in the design of a refrigerator.

For efficient utilization of the storage space, a conventional refrigerator is provided therein not with a space for receiving storage objects but with a drawer configured to be put into and taken out of the storage space and shelves for supporting the storage objects.

Because the storage space provided in the refrigerator is partitioned by drawers, shelves or the line in consideration of the volume of storage objects, the number or the volume of receiving components (shelves, drawers and the like) capable of being mounted in the storage space having the maximum volume, which is determined according to the capacity of the refrigerator, is inevitably restricted.

This means that some of the drawers and shelves have to be omitted, the volume of the drawers has to be reduced, or the distance between the shelf and the drawer or the distance between the shelves has to be reduced in order to add additional receiving component space to the storage space in the refrigerator. The reason for this is because, in order to add a new receiving component, a portion of the storage space has to be used as a space required to accommodate installation of the receiving component.

However, a change of design in which the number or the volume of drawers and shelves is reduced for installation of a new receiving component may cause a problem whereby the drawers or shelves cannot accommodate the amount of storage objects that is determined at the time of design, thereby decreasing storage efficiency.

In addition, because a change of design in which the number or the volume of drawers and shelves is reduced for installation of a new receiving component is no different from the design of a new storage space, it is difficult to add a new receiving component to a conventional refrigerator while maintaining the volume of the storage space that is already designed.

DISCLOSURE

Technical Problem

The present invention is intended to solve the above-described problems with a conventional refrigerator.

An embodiment of the present invention is intended to provide a receiving unit capable of minimizing the amount of space required for installation and a refrigerator including the receiving unit.

An embodiment of the present invention is intended to provide a receiving unit provided in a partition wall, configured to isolate storage spaces from each other, so as to provide additional storage space without reducing the size of a predetermined space for receiving storage objects, and a refrigerator including the receiving unit.

An embodiment of the present invention is intended to provide a refrigerator designed to facilitate manipulation of a door for opening and closing a receiving unit and to minimize the amount of space required for manipulation of the door, thereby minimizing a reduction in amount of the storage space in the refrigerator.

An embodiment of the present invention is intended to provide a receiving unit designed to provide a door with restoring force so as to open and close an introduction port of a receiving unit and designed to reduce the speed of movement of a door for opening and closing an introduction port from the time the door passes over a specific point of the introduction port, and a refrigerator including the receiving unit.

An embodiment of the present invention is intended to provide a receiving unit capable of preventing foreign substances from entering a transfer unit for actuating a door and a refrigerator including the receiving unit.

An embodiment of the present invention is intended to provide a receiving unit including a guide for guiding movement of a door for opening and closing an introduction port of the receiving unit so as to enable the door to be stably actuated and a refrigerator including the receiving unit.

An embodiment of the present invention is intended to provide a refrigerator in which a door for opening and closing an introduction port of a receiving unit is configured to be moved anteroposteriorly and horizontally, thereby making it convenient to use the refrigerator. Particularly, the embodiment is intended to provide a refrigerator having an attractive design in which components for guiding or supporting movement of the door are positioned at a rear side and/or opposite lateral edges of the door.

Technical Solution

In order to achieve the objects, according to an embodiment of the present invention, a refrigerator may include a first storage compartment having a space for receiving therein an object to be refrigerated or frozen; a second storage compartment positioned below the first storage compartment and having a space for receiving therein an object to be refrigerated or frozen; a partition wall configured to isolate the first storage compartment from the second storage compartment upwards and downwards; a receiver including a space depressed downwards from the upper surface of the partition wall so as to receive an object to be refrigerated or frozen; a receiver door configured to be moved in a direction parallel to the upper surface of the partition wall so as to open or close the receiver; an elastic-force provider for providing the receiver door with restoring force when the receiver door is moved in order to open the receiver; and a transfer unit including a speed controller for reducing a moving speed of the receiver door when the receiver door is moved to close the receiver.

The transfer unit may include a transfer-unit body secured to the partition wall and to one end of the elastic-force provider; a transfer space provided in the transfer-unit body so as to be parallel to a direction of movement of the receiver door; and a slider movably provided in the transfer space, the slider being connected to the receiver door and being secured to a remaining end of the elastic-force provider, and the speed controller may include a cylinder secured to the transfer-unit body; a piston disposed at one end thereof in the cylinder and connected at a free end thereof to the slider; and a head secured to the one end of the piston and disposed in the cylinder.

The transfer unit may include a transfer-unit body secured to the partition wall and to one end of the elastic-force provider; a transfer space provided in the transfer-unit body so as to be parallel to a direction of movement of the receiver door; a slider movably provided in the transfer space, the slider being connected to the receiver door and being secured to a remaining end of the elastic-force provider; and a rack provided at the slider, and the speed controller may include a gear rotatably secured to the transfer-unit body and engaged with the rack; and a resisting-force provider for providing resisting force upon rotation of the gear.

The resisting-force provider may include a case for containing a liquid; a rotator rotatably disposed in the case; and a rotating shaft penetrating the case so as to connect the gear to the rotator.

The gear may be engaged with the rack when the receiver door passes over a range between a point at which the receiver door begins to close the receiver and a point at which the receiver door closes the receiver by 50%.

The gear may be engaged with the rack when the receiver door passes over a range between a point at which the receiver door closes the receiver by 50% or more and a point at which the receiver door closes the receiver by 90%.

The refrigerator may further include a position holder for maintaining a state in which the receiver door opens the receiver, and the position holder may include a coupling protrusion provided at one of the slider and the transfer-unit body; and a coupling grab provided at a remaining one of the slider and the transfer-unit body, the coupling protrusion being removably coupled to the coupling protrusion.

The coupling grab may be configured to be repeatedly engaged with the coupling protrusion and released from the coupling protrusion whenever external force is applied to the coupling grab.

The elastic-force provider may include a spool rotatably secured to the transfer-unit body; and a metal strip secured at one end thereof to the spool and at a remaining end thereof to the slider, the metal strip being wound around the spool.

An embodiment of the present invention may further include a transfer-unit recess provided in the partition wall in a direction parallel to a direction of movement of the receiver door; and a cover secured to the slider so as to be moved therewith, the cover being positioned above the transfer-unit recess when the door closes the receiver.

An embodiment of the present invention may include a cover support secured to the transfer-unit body but not secured to the cover so as to support a lower surface of the cover; a coupling protrusion provided at the slider; and a coupling grab provided at the cover support, the coupling protrusion being removably coupled to the coupling grab.

The transfer-unit recess may be positioned in an area on the partition wall covered by the cover body.

The present invention may further include a blocking wall provided around a periphery of the transfer-unit recess so as to prevent foreign substances from entering the transfer-unit recess, and a width of the cover may be greater than a width of the blocking wall.

The present invention may further include a connector body secured to the receiver body; a slider coupler provided at the connector body so as to be removably coupled to the slider; and a blocking member provided between the connector body and the slider coupler so as to prevent liquid from entering the transfer-unit recess.

The blocking member may further include a discharge guide provided between the connector body and the slider coupler, the discharge guide having a width greater than a width of the blocking wall; and a connector sloping surface for guiding liquid introduced between the connector body and the discharge guide toward an outside of the blocking wall.

An embodiment of the present invention may further include a first sloping surface inclined downwards toward a peripheral edge of the partition wall from one lateral side of the blocking wall parallel to a direction of movement of the receiver door; and a second sloping surface inclined downwards toward a peripheral edge of the partition wall from an opposite lateral side of the blocking wall parallel to a direction of movement of the receiver door.

The transfer unit may further include a transfer-unit body secured to one end of the elastic-force provider; a transfer space provided in the transfer-unit body so as to be parallel to a direction of movement of the receiver door; a first slider movable in the transfer space; and a second slider removably provided at the first slider and connected to the receiver door, the second slider being coupled to a remaining end of the elastic-force provider.

The speed controller may include a cylinder secured to the transfer-unit body; a piston disposed in the cylinder and connected at a free end thereof to the first slider; and a head secured to one end of the piston and disposed in the cylinder.

The second slider may be moved in a state of being secured to the first slider when the first slider is moved in a predetermined moving range of the free end, and may be separated from the first slider when the first slider is moved beyond the predetermined moving range of the free end.

An example of the present invention may include a first stopper and a second stopper, which are provided at the first slider so as to define a space for receiving the second slider; a first support and a second support, which are provided in the transfer space so as to define a moving path of the first slider; and a height controller configured to lower the first stopper, which is positioned in a direction in which the second slider is separated from the first slider, to a position lower than the first support and the second support when the free end of the piston reaches a reference point which is set be a point in the moving range.

The height controller may include a first projection, which projects from the first slider so as to cause the first slider to be supported by the first support; a second projection, which projects from the first slider so as to cause the first slider to be supported by the second support; a first receiving groove disposed at a position lower than the first support so as to receive the first projection therein; a second receiving groove disposed at a position lower than the second support so as to receive the second projection therein; a first sloped portion inclined downwards toward the first receiving groove from the first support so as to cause the first projection to be positioned in the first receiving groove when the free end of the piston reaches the reference point; and a second sloped portion inclined downwards toward the second receiving groove from the second support so as to cause the second projection to be positioned in the second receiving groove when the free end of the piston reaches the reference point.

An embodiment of the present invention may further include a first side wall and a second side wall, which define the transfer space; a first transfer groove formed in the first side wall in a direction of movement of the door; a second transfer groove formed in the second side wall in a direction of movement of the door; a first slider protrusion, which projects from the first slider and is fitted into the first transfer groove; and a second slider protrusion, which projects from the first slider and is fitted into the second transfer groove.

An embodiment of the present invention may further include an insulator disposed at a lower surface of the body so as to thermally isolate the first space from the second space, and the receiver may be provided in the insulator.

In order to achieve the objects, according to an embodiment of the present invention, a refrigerator may include a first storage compartment positioned at an upper side of a cabinet; a second storage compartment positioned below the first storage compartment; a partition wall configured to isolate the first storage compartment from the second storage compartment upwards and downwards and to have a horizontal upper surface; a receiver including a receiving space depressed downwards from the upper surface of the partition wall and an introduction port formed in an upper portion thereof so as to allow storage objects to be introduced into the receiving space therethrough; and a receiver door configured to be moved in a direction parallel to the upper surface of the partition wall so as to selectively open or close the introduction port.

An embodiment of the present invention may include a transfer unit for guiding movement of the receiver door and providing the receiver door with elastic force and/or damping force.

The transfer unit may be positioned behind the receiver door.

The transfer unit may be positioned behind the receiver door and at a center of the receiver door in a lateral direction.

In addition to the transfer unit, guides may be provided at opposite ends of the receiver door so as to guide movement of the receiver door. Accordingly, the receiver door may be moved anteroposteriorly thorough the three support points.

The transfer unit may include an elastic-force provider for providing the receiver door with restoring force when the receiver door is moved in order to open the receiver; and a speed controller for reducing a moving speed of the receiver door when the receiver door is moved to close the receiver.

The receiver may be provided at a front side of an upper surface of the partition wall, and an anteroposterior length of the receiver door may be greater than an anteroposterior length of the introduction port such that the receiver door covers an entire anteroposterior length of the introduction port.

The receiver door may be configured to be slidably moved anteroposteriorly on the upper surface of the partition wall, and an anteroposterior length of the receiver door may be smaller than an anteroposterior length of the first storage compartment, which is defined by the partition wall.

A receiving unit may be provided above a rear side of the introduction port separately from the receiver.

The receiver door may be configured to be moved rearwards through a gap between the upper surface of the partition wall and the receiving unit.

The transfer unit may include a transfer-unit body secured to the partition wall and to one end of the elastic-force provider; a transfer space provided in the transfer-unit body so as to be parallel to a direction of movement of the receiver door; and a slider movably provided in the transfer space, the slider being connected to the receiver door and being secured to a remaining end of the elastic-force provider.

The transfer unit may include a transfer-unit recess formed in the partition wall behind the receiver so as to be parallel to a direction of movement of the receiver door and to receive the transfer-unit body.

The transfer-unit recess may be depressed downwards from the upper surface of the partition wall like the receiver.

The transfer unit may include a cover disposed above the transfer-unit recess so as to prevent foreign substances from entering the transfer-unit recess. Accordingly, it is possible to prevent malfunction of an actuation mechanism for the transfer unit due to the presence of foreign substances. Particularly, it is possible to prevent infiltration of water and to thus prevent malfunction of the transfer unit due to water condensation.

The cover may be configured to be anteroposteriorly moved together with the receiver door.

In this case, the cover covers the entire transfer-unit recess when the receiver door is closed, and a portion of the receiver door covers the transfer-unit recess when the receiver door is open. Accordingly, in any case, the transfer-unit recess is entirely covered by the receiver door and/or the cover.

The cover may be secured to the slider so as to be moved therewith, the cover being positioned above the transfer-unit recess when the receiver door closes the receiver.

The transfer unit may include a cover support secured to the transfer-unit body so as to support a lower surface of the cover; a coupling protrusion provided at the slider; and a coupling grab provided at the cover support, the coupling protrusion being removably coupled to the coupling grab.

The coupling protrusion and the coupling grab may be considered as a position holder for the receiver door. In other words, these may be considered as components for holding a position of the receiver door when the receiver door is open.

The transfer-unit recess may be positioned in an area on the partition wall covered by the cover body.

The refrigerator may further include a blocking wall provided around a periphery of the transfer-unit recess so as to prevent foreign substances from entering the transfer-unit recess, and a width of the cover may be greater than a width of the blocking wall.

Accordingly, it is possible to prevent foreign substances from entering the transfer-unit recess from the upper surface of the partition wall around the transfer-unit recess.

The refrigerator may further include a connector body secured to the receiver body; a slider coupler provided at the connector body so as to be removably coupled to the slider; and a blocking member provided between the connector body and the slider coupler so as to prevent liquid from entering the transfer-unit recess.

The blocking member may further include a discharge guide provided between the connector body and the slider coupler, the discharge guide having a width greater than a width of the blocking wall; and a connector sloping surface for guiding liquid introduced between the connector body and the discharge guide toward an outside of the blocking wall.

The refrigerator may further include a first sloping surface inclined downwards toward a peripheral edge of the partition wall from one lateral side of the blocking wall parallel to a direction of movement of the receiver door; and a second sloping surface inclined downwards toward a peripheral edge of the partition wall from an opposite lateral side of the blocking wall parallel to a direction of movement of the receiver door.

The cover may be secured to the partition wall so as to allow the receiver door to be moved anteroposteriorly thereunder. In this case, the cover always covers the transfer-unit recess.

The speed controller may include a cylinder secured to the transfer-unit body; a piston disposed at one end thereof in the cylinder and connected at a free end thereof to the slider; and a head secured to the one end of the piston and disposed in the cylinder.

The transfer unit may include a rack provided at the slider, and the speed controller may include a gear rotatably secured to the transfer-unit body and engaged with the rack and a resisting-force provider for providing resisting force upon rotation of the gear.

The elastic-force provider may include a spool rotatably secured to the transfer-unit body; and a metal strip secured at one end thereof to the spool and at a remaining end thereof to the slider, the metal strip being wound around the spool. The spool may be rotated about a horizontal rotating shaft. In other words, the elastic-force provider may be composed of a leaf spring.

A general coil spring provides an elastic force that increases with an increase in displacement. However, a leaf spring tends to have a constant elastic force even with an increase in displacement. Accordingly, it is possible for the receiver door to be stably and smoothly closed.

In order to achieve the objects, according to an embodiment of the present invention, a refrigerator includes a first storage compartment positioned at an upper side of a cabinet; a second storage compartment positioned below the first storage compartment; a partition wall configured to isolate the first storage compartment from the second storage compartment upwards and downwards and to have a horizontal upper surface; a receiver including a receiving space depressed downwards from the upper surface of the partition wall and an introduction port formed in an upper portion thereof so as to allow storage objects to be introduced into the receiving space therethrough; a receiver door configured to be moved in a direction parallel to the upper surface of the partition wall so as to selectively open or close the introduction port; a transfer-unit recess depressed downwards from the upper surface of the partition wall behind the receiver; a transfer unit provided in the transfer-unit recess so as to guide an anteroposterior movement of the receiver door; and a cover disposed above the transfer-unit recess to cover the transfer-unit recess so as to prevent foreign substances from entering the transfer-unit recess.

The cover may be connected to the receiver door so as to be moved therewith. In this case, the receiver door may cover a portion of the transfer-unit recess when the receiver door is moved rearward.

The cover may be secured to the partition wall so as to allow the receiver door to be moved anteroposteriorly thereunder. In this case, the cover always covers the transfer-unit recess.

The transfer unit may be positioned at a center of the receiver door in a lateral direction so as to guide an anteroposterior movement of the receiver door.

In addition to the transfer unit, a pair of guides may be provided at opposite ends of the receiver door so as to guide an anteroposterior movement of the receiver door. Accordingly, the receiver door may be moved anteroposteriorly thorough the three support points.

Advantageous Effects

According to an embodiment of the present invention, it is possible to provide a receiving unit capable of minimizing a space required for installation and a refrigerator including the receiving unit.

According to an embodiment of the present invention, it is possible to provide a receiving unit provided in a partition wall, configured to isolate storage spaces from each other, so as to provide an additional storage space without reducing a predetermined space for receiving storage objects, and a refrigerator including the receiving unit.

According to an embodiment of the present invention, it is possible to provide a refrigerator designed to facilitate manipulation of a door for opening and closing a receiving unit and to minimize an amount of space required for manipulation of the door, thereby minimizing a reduction in the amount of storage space in the refrigerator.

According to an embodiment of the present invention, it is possible to provide a refrigerator designed to provide a door having a restoring force so as to open and close an introduction port of a receiving unit. Furthermore, it is possible to provide a receiving unit configured to reduce the speed of movement of a door for opening and closing an introduction port from the time the door passes over a specific point of the introduction port, and a refrigerator including the receiving unit.

According to an embodiment of the present invention, it is possible to provide a receiving unit capable of preventing foreign substances from entering a transfer unit for actuating a door and a refrigerator including the receiving unit. Furthermore, it is possible to provide a refrigerator having an attractive appearance in which a receiving unit is mounted so as to be invisible to a user.

According to an embodiment of the present invention, it is possible to provide a receiving unit including a guide for guiding the movement of a door for opening and closing an introduction port of the receiving unit so as to enable the door to be stably actuated and a refrigerator including the receiving unit.

According to an embodiment of the present invention, it is possible to provide a refrigerator in which a door for opening and closing an introduction port of a receiving unit is configured to be moved anteroposteriorly and horizontally, thereby making it convenient to use the refrigerator. Particularly, it is possible to provide a refrigerator having an attractive design in which components for guiding or supporting the movement of the door are positioned at a rear side and/or opposite lateral edges of the door.

According to an embodiment of the present invention, it is possible to provide a refrigerator in which a door of a receiving unit is maintained in the open state when a user opens the door, thereby making it convenient to use the refrigerator.

BEST MODE

Hereinafter, preferred embodiments of the present invention will be described in detail with reference to the accompanying drawings.

Unless otherwise specially indicated, all terms used in the specification are identical to general meanings of the terms understood by a person having ordinary skill in the art. If a term used in the specification conflicts with the general meaning of the term, the meaning should be understood to comply with the definition noted in the specification.

It should be noted herein that the construction of an apparatus, which will hereinafter be described, and a method of controlling the apparatus are given only for illustrative purposes, and the scope of protection of the invention is not limited thereto. Wherever possible, the same reference numbers will be used throughout the drawings to refer to the same or like parts.

Figure 1:
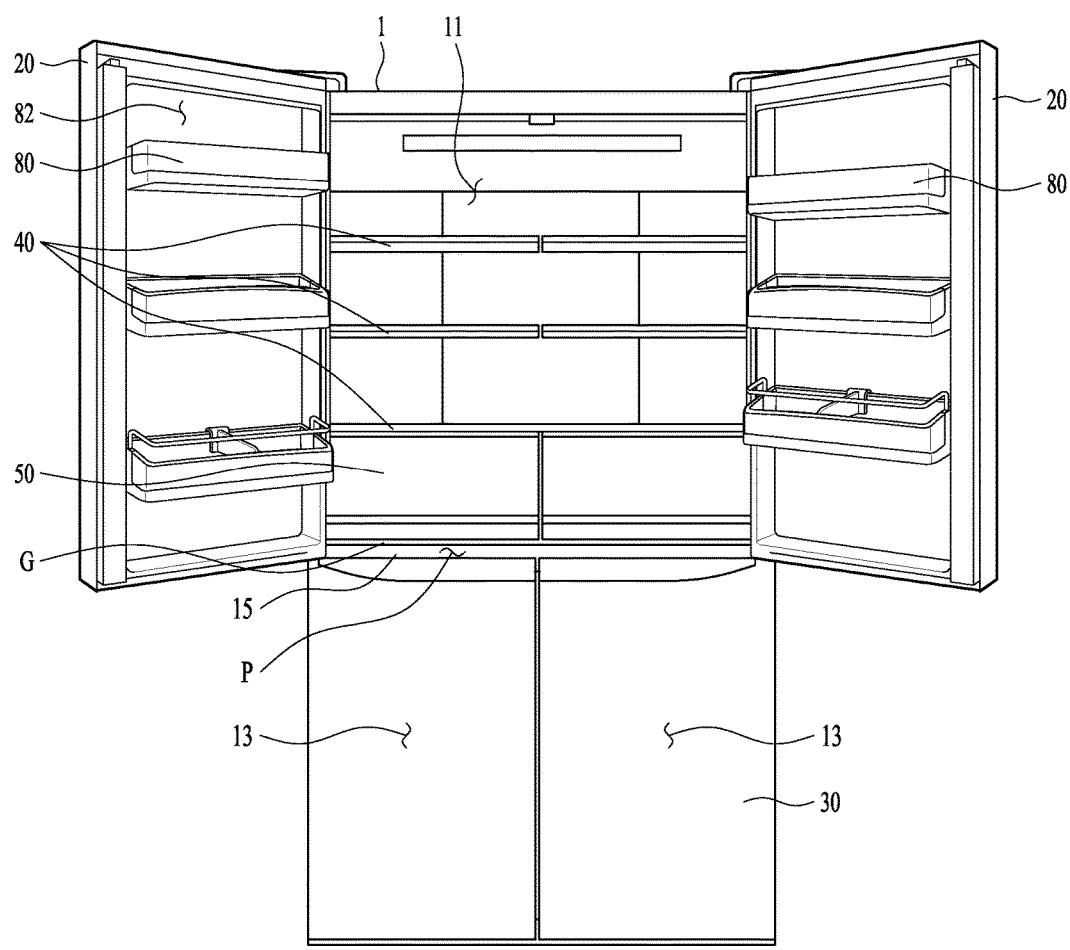
FIG. 1 illustrates a refrigerator according to an embodiment of the present invention.

FIG. 1 is a front view of a refrigerator according to an embodiment of the present invention, in which a storage compartment door is open.

The refrigerator according to the present invention may be applied to both a top-mount type refrigerator, in which a refrigerating compartment and a freezing compartment for storing foodstuffs are isolated from each other upwards and downwards and the freezing compartment is located above the refrigerating compartment, and a side-by-side type refrigerator, in which a freezing compartment and a refrigerating compartment are isolated from each other right and left.

However, this embodiment will be described with a focus on a bottom-freezer type, in which a refrigerating compartment and a freezing compartment are isolated from each other upwards and downwards and the freezing compartment is located below the refrigerating compartment, for convenience of explanation.

The refrigerator includes a case or a cabinet 1, which defines the overall appearance of the refrigerator when viewed from the outside by a user, and storage compartments 11 and 13, which are defined in the cabinet 1 so as to store foodstuffs.

The refrigerator includes doors 20 and 30 for opening and closing the storage compartments. The doors may include a freezing compartment door 30 and a refrigerating compartment door 20, each of which is rotatably coupled at one end thereof to the cabinet 1 of the refrigerator via a hinge. Each of the doors 30 and 20 may be composed of a plurality of doors. In other words, each of the refrigerating compartment door 20 and the freezing compartment door 30 may be composed of a pair of doors, which are configured to be opened forwards about opposite lateral sides of the refrigerator, as illustrated in FIG. 1.

The storage compartments 11 and 13 define insulated spaces, which are isolated from the outside by means of the doors 20 and 30. The storage compartments 11 and 13 may define insulated spaces, which are isolated from the outside when the doors 20 and 30 close the storage compartments 11 and 13. In other words, the storage compartments 11 and 13 may be considered as spaces, which are thermally isolated from the outside by means of the insulated walls constituted by the doors 20 and 30 and the insulated wall constituted by the cabinet 1.

Since cold air supplied from a machinery room is introduced into and circulated in the storage compartments 11 and 13, it is possible to maintain the foodstuffs stored in the storage compartments at a low temperature. In this embodiment, the storage compartment that is positioned at the upper side of the refrigerator may be referred to as a first storage compartment. For example, the first storage compartment may be the refrigerating compartment. The storage compartment that is positioned at the lower side of the refrigerator may be referred to as a second storage compartment. For example, the second storage compartment may be the freezing compartment. The first storage compartment may be composed of a single storage compartment, which is opened and closed by means of left and right doors 20, and the second storage compartment may be composed of a pair of storage compartments, which are isolated from each other right and left and are opened and closed by left and right doors 30.

The storage compartment 11 may be provided at the bottom thereof with a barrier or a partition wall 15. Specifically, the storage compartment 11 may be provided at the lower end thereof with the partition wall 15 so as to isolate the refrigerating compartment from the freezing compartment. The partition wall 15 may have a predetermined thickness and may extend horizontally.

The storage compartment 11 may include a shelf 40 on which foodstuffs are placed. The shelf 40 may be composed of a plurality of shelves, on any of which foodstuffs are placed. The shelf 40 may partition the internal space of the storage compartment horizontally.

The storage compartment may be provided with a drawer 50, which is capable of being put into or drawn out of the storage compartment 11. The drawer 50 contains foodstuffs and the like. The drawer 50 may be composed of a pair of drawers, which are positioned at right and left sides in the storage compartment 12. A user may open the left door in order to access to the drawer disposed at the left side. Similarly, a user may open the right door in order to access to the drawer disposed at the right side.

The partition wall 15 may be provided with a space for containing foodstuffs. The space may be referred to as a multi-receiving compartment or a receiving unit P (or third storage compartment). The partition wall 15 may be constructed separately from the doors 20 and 30. Accordingly, the partition wall 15 may remain in place without moving even when the doors 20 and 30 are rotated. Consequently, a user may reliably put foodstuffs into the storage compartment by virtue of the receiving unit P, or may reliably take the foodstuffs out of the storage compartment by virtue of the receiving unit P.

The storage compartment 11 may be partitioned into a plurality of spaces for storing foodstuffs, that is, a space positioned above the shelf 40, a space defined by the drawer 50, and the receiving unit P, defined by the partition wall 15.

The receiving unit P may be depressed downwards from the partition wall 15, which defines the lower surface of the storage compartment 11. In other words, the receiving unit P may be formed by reducing the thickness of the partition wall 15 somewhat. Accordingly, the internal volume of the storage compartment 11 may be increased by virtue of the receiving unit P.

Cold air supplied to the storage compartment 11 may be introduced into all of the spaces defined in the single storage compartment 11. Specifically, since cold air is able to flow among the spaces, the spaces may be considered to be conceptually different from the above-described storage compartments.

Specifically, unlike the storage compartments which define insulated spaces, the spaces are not insulated from each other, although there may be a temperature difference between the spaces.

Cold air supplied to one of the storage compartments cannot flow into another storage compartment but can freely flow into any of the spaces defined in the storage compartment. In other words, cold air, which is positioned above the shelf 40, may flow into the space defined by the drawer 50.

The refrigerating compartment door 20 may be provided therein with a plurality of baskets 80. The plurality of baskets 80 may be disposed at different heights from each other, and foodstuffs may be stored in the internal space defined in the baskets 80.

A gap G may be defined between the upper surface of the partition wall 15, that is, the lower surface of the storage compartment 11 and a separate storage space such as the drawer 50. The gap G is intended to provide a space for allowing a receiver door, adapted to open and close a receiver to be described later, to be moved therethrough. Accordingly, the gap G may be formed at a height corresponding to the height of the receiver door having a horizontal plate shape. In other words, the gap G may have a height such that only the receiver door can be smoothly moved therethrough.

Hereinafter, the receiving unit P according to an embodiment of the present invention will be described in more detail.

Figure 2:
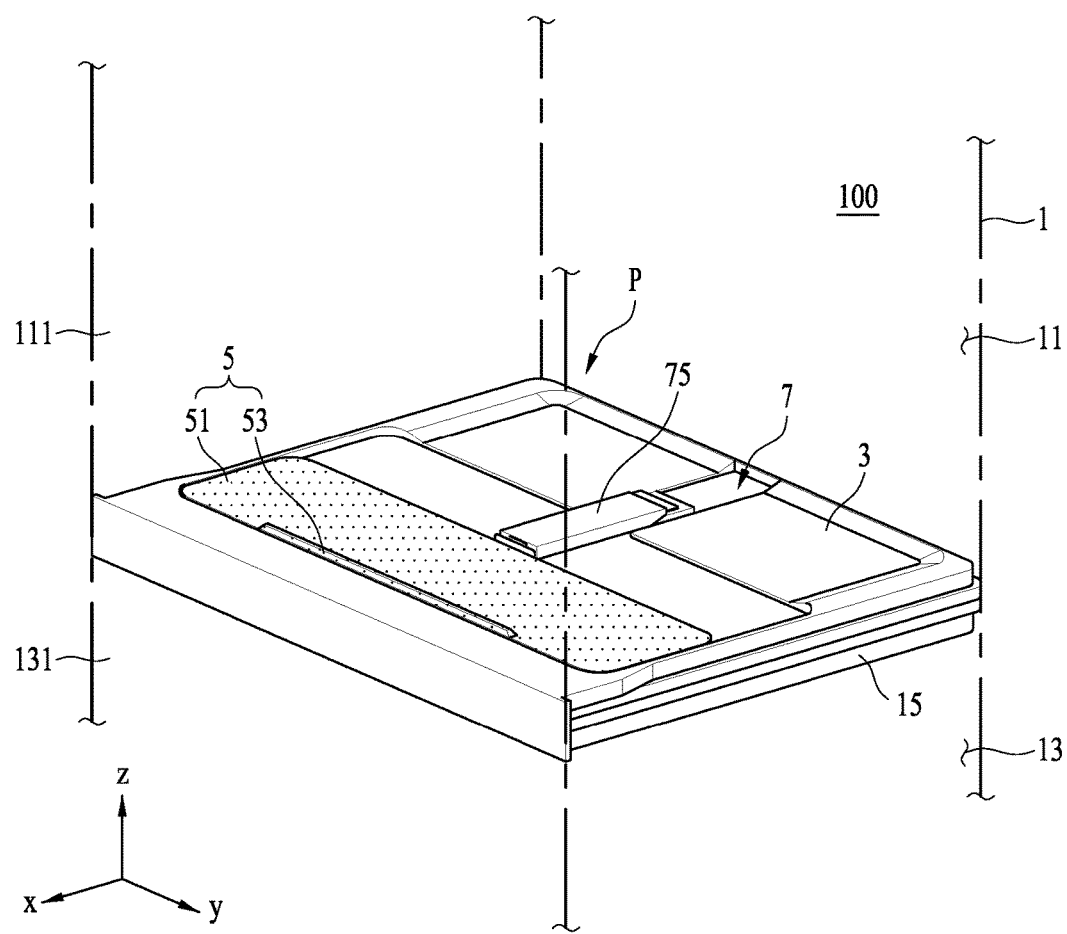
FIG. 2 illustrates a receiving unit shown in FIG. 1, in which a receiver door is closed.

As illustrated in FIG. 2, the refrigerator 100 according to the present invention may include the cabinet 1, the storage compartments 11 and 13, which are provided in the cabinet 1 to provide a space for receiving storage objects (objects to be refrigerated or objects to be frozen), and a heat exchange unit for exchanging heat with the internal air in the storage compartments.

The storage compartments may be provided in a plural number in the cabinet 1. FIG. 2 illustrates an example in which the storage compartment is divided into the first storage compartment 11 and the second storage compartment 13.

When the storage compartment is divided into the first storage compartment 11 and the second storage compartment 13, the first storage compartment 11 may be one of the refrigerating compartment and the freezing compartment, and the second storage compartment 13 may be the other of the refrigerating compartment and the freezing compartment. In this case, the first storage compartment 11 and the second storage compartment 13 may be separated from each other by means of the partition wall 15.

Alternatively, the first storage compartment 11 and the second storage compartment 13 may be formed by dividing one refrigerating compartment or freezing compartment into two compartments using the partition wall 15.

Each of the storage compartments 11 and 13 has to be provided with an open surface through which storage objects are taken out of the cabinet 1. Specifically, the first storage compartment 11 may communicate with the outside through a first open surface or a first opening 111, and may communicate with the outside through a second open surface or a second opening 131.

The first open surface 111 and the second open surface 131 may be configured to be opened and closed by the doors 20 and 30.

However, in the case in which the first storage compartment 11 and the second storage compartment 13 are isolated from each other in one refrigerating compartment or freezing compartment, the first storage compartment 11 and the second storage compartment 13 may be concurrently opened and closed by means of a single door.

The heat exchange unit may include a compressor configured to compress refrigerant, a condenser configured to cause the refrigerant discharged from the compressor to exchange heat with air outside the cabinet so as to condense the refrigerant, an expansion valve configured to reduce the pressure of the refrigerant discharged from the condenser and an evaporator configured to cause the refrigerant passed through the expansion valve to exchange heat with air in the storage compartments 11 and 13 so as to evaporate the refrigerant. Since the evaporator absorbs heat from the air in the storage compartments, the air in the storage compartments is cooled while passing through the evaporator. By virtue of this procedure, the heat exchange unit is able to control the temperature of the first space 11 and the second space 13 so as to be lower than the ambient temperature.

The partition wall 15, which divides the internal space of the refrigerator into the first storage compartment 11, that is, the first space, and the second storage compartment 13, that is, the second space, is provided with the receiving unit P. The receiving unit P may include the receiver 4 (or recess, storage space), which is depressed downwards from the partition wall 15 so as to define a space for receiving storage objects, and the receiver door 5 configured to be moved in a direction parallel to the upper surface of the partition wall 15.

The receiver 4 may be formed in the partition wall 15 itself, or may be formed in a receiver body 3 coupled to the partition wall 15. When the receiver body 3 is coupled to an upper portion of the partition wall 15, the receiver body 3 may be made of a material different from that of the partition wall 15.

Any structure may be considered to be the partition wall 15 as long as the structure has a predetermined thickness (a length in the height direction of the cabinet, that is, a length in the z-axis direction) so as to divide the storage space into two spaces.

When the first storage compartment 11 is one of the refrigerating compartment and the freezing compartment and the second storage compartment 13 is the other of the refrigerating compartment and the freezing compartment, the partition wall 15 may include an insulator, and the receiver body 3 may define the upper surface of the partition wall 15.

However, if the first storage compartment 11 and the second storage 13 are spaces resulting from the division of a single refrigerating compartment or freezing compartment, the receiver body 3 may serve as the partition wall 15 because there is no necessity to provide the insulator.

Hereinafter, the case in which the receiver body 3 defines the upper surface of the partition wall 15 will be described for convenience of explanation.

As illustrated in FIG. 2, the receiver 4 may be a space that is formed by depressing the surface of the receiver body 3 toward the second storage compartment 13. Storage objects may be introduced into the receiver 4 through an introduction port 41 (or inlet, opening) formed in the upper surface of the receiver 4. The receiver 4 may be positioned at the front surface of the receiver body 3, which faces the door of the cabinet. In other words, the receiver 4 may be formed in the front side of the lower surface of the first storage compartment 11.

When the receiving unit P according to an embodiment of the present invention is provided at the partition wall 15, an additional component such as the above-described shelf 40 or the drawer 50 may further be provided above and close to the receiving unit P. In this case, if the gap between the receiving unit P and the additional component is small, a user may easily put a storage object into the receiver 4 or may easily take the storage object out of the receiver 4 only when the receiver 4 is positioned at a front side of the first storage compartment 11.

Specifically, the shelf 40 or the drawer 50 may be disposed above a rear side of the receiving unit P, rather than being disposed directly above the receiving unit P. A gap G may be defined between the receiving unit P and the shelf 40 or the drawer 50.

The receiver 4 may be composed of a receiving groove, which is integrally formed in the receiver body 3, or may be composed of the receiving groove and a tray, removably coupled to the receiving groove.

In the case in which the receiver 4 is composed of the receiving groove and the tray, it is possible for a user to take the tray out through the introduction port 41 and to wash the tray when it is a necessary to wash the receiver 4, thereby providing an effect of enabling the receiver 4 to be easily cleaned compared to the case in which the receiver 4 is composed only of the receiving groove.

When the receiver body 3 is configured to form the upper surface of the partition wall 15, there is no need to provide an additional space for mounting the receiver 4 because the receiver 4 is embedded in the partition wall 15.

Specifically, when the receiver body 3 forms the upper surface of the partition wall 15 and the receiver 4 is positioned in the partition wall 15, the receiving unit P according to an embodiment of the present invention may be mounted in the storage compartment 11 without reducing the sizes of the storage compartments 11 and 13, which have limited internal spaces. In other words, it is possible to increase the overall internal space.

That it is possible to mount the receiver 4 without reducing the internal space in the storage spaces 11 and 13 indicates that it is possible to add space for receiving storage objects without changing the volume of the component (the drawer, the shelf or the like), which is mounted in the storage spaces 11 and 13 so as to receive storage objects. Accordingly, if the receiver body 3 is configured to form the upper surface of the partition wall 15 (i.e., the receiving unit is provided at the partition wall), there is an effect of minimizing the volume of the space required to mount the receiving unit P.

Figure 3:
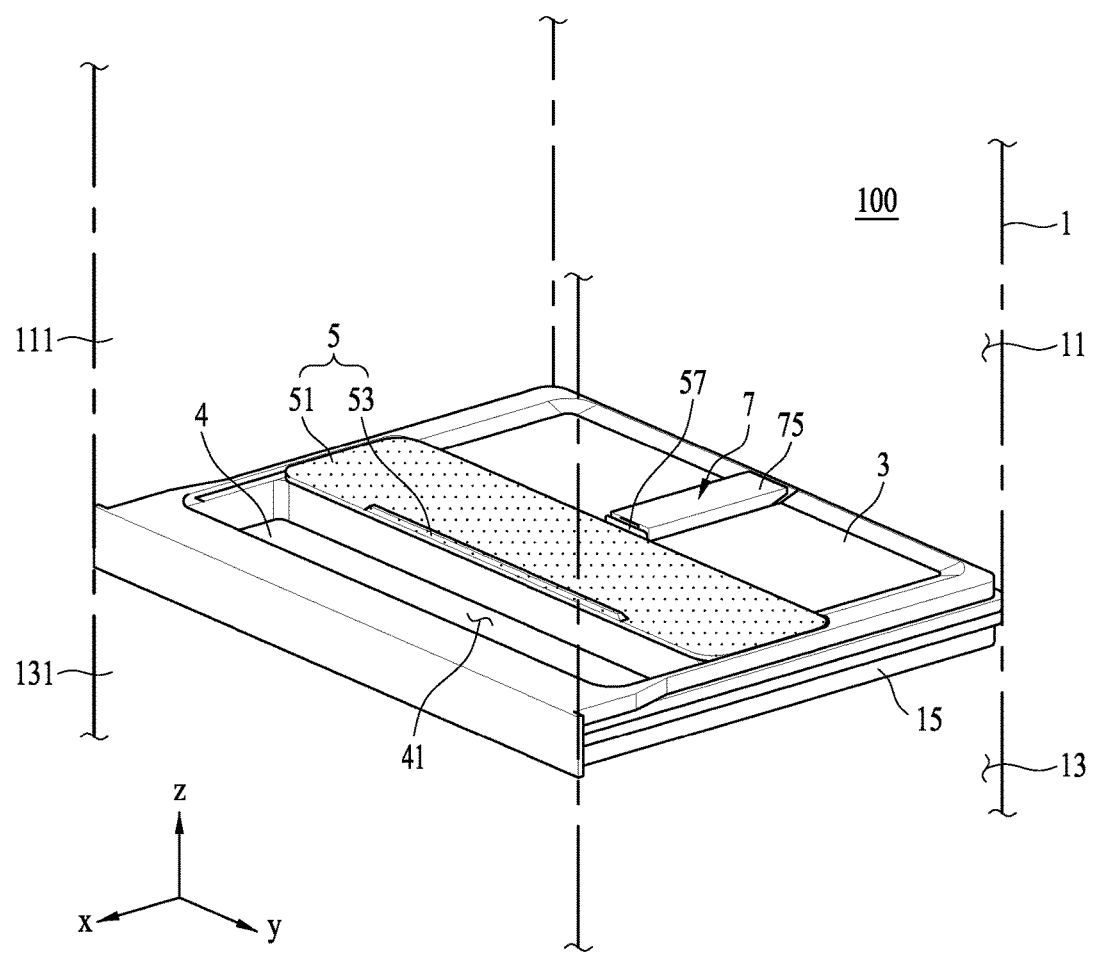
FIG. 3 illustrates the receiving unit shown in FIG. 1, in which the receiver door is open.

As illustrated in FIGS. 2 and 3, the receiver door 5, which is intended to open and close the introduction port 41 formed in the receiver, may include a door body 51 capable of being moved along the surface of the receiver body 3. The door body 51 may be provided with a handle 53 so as to facilitate handling of the door body 51.

The receiver 4 is depressed downwards, and the introduction port 41 is formed in the upper surface of the receiver. Accordingly, introduction and removal of foodstuffs through the introduction port 41 is performed vertically. The movement of the receiver door for opening and closing the introduction port 41 is performed vertically. Accordingly, the direction of introduction of foodstuffs may be perpendicular to the direction of movement of the receiver door 5.

Generally, each of the storage compartments 11 and 13 of the refrigerator may be provided with the drawer 50, which is drawn out of the storage space so as to receive storage objects, or may be provided with the shelves 40, which are arranged in a vertical direction and are secured to the inside of the storage space so as to support storage objects.

Accordingly, the drawer or the shelf may be provided above the receiving unit P. Here, in the case in which the receiver door 5 is coupled to the receiver body 3 so as to be rotated toward the drawer or the shelf positioned thereabove, it is possible to put storage objects into the receiver 4 or to take the storage objects out of the receiver 4 only when the distance between the receiving unit P and the drawer or the shelf is larger than the radius of rotation of the receiver door 5.

If there is a need to change the height of the drawer or the shelf in order to mount the receiving unit P, this means that the storage space is reduced. Accordingly, the configuration, in which the introduction port 41 of the receiving unit P is opened and closed by means of the door body 51, which is capable of being moved in a direction parallel to the surface of the receiver body 3, is intended to minimize the internal space required to mount the receiver P.

Figure 4:
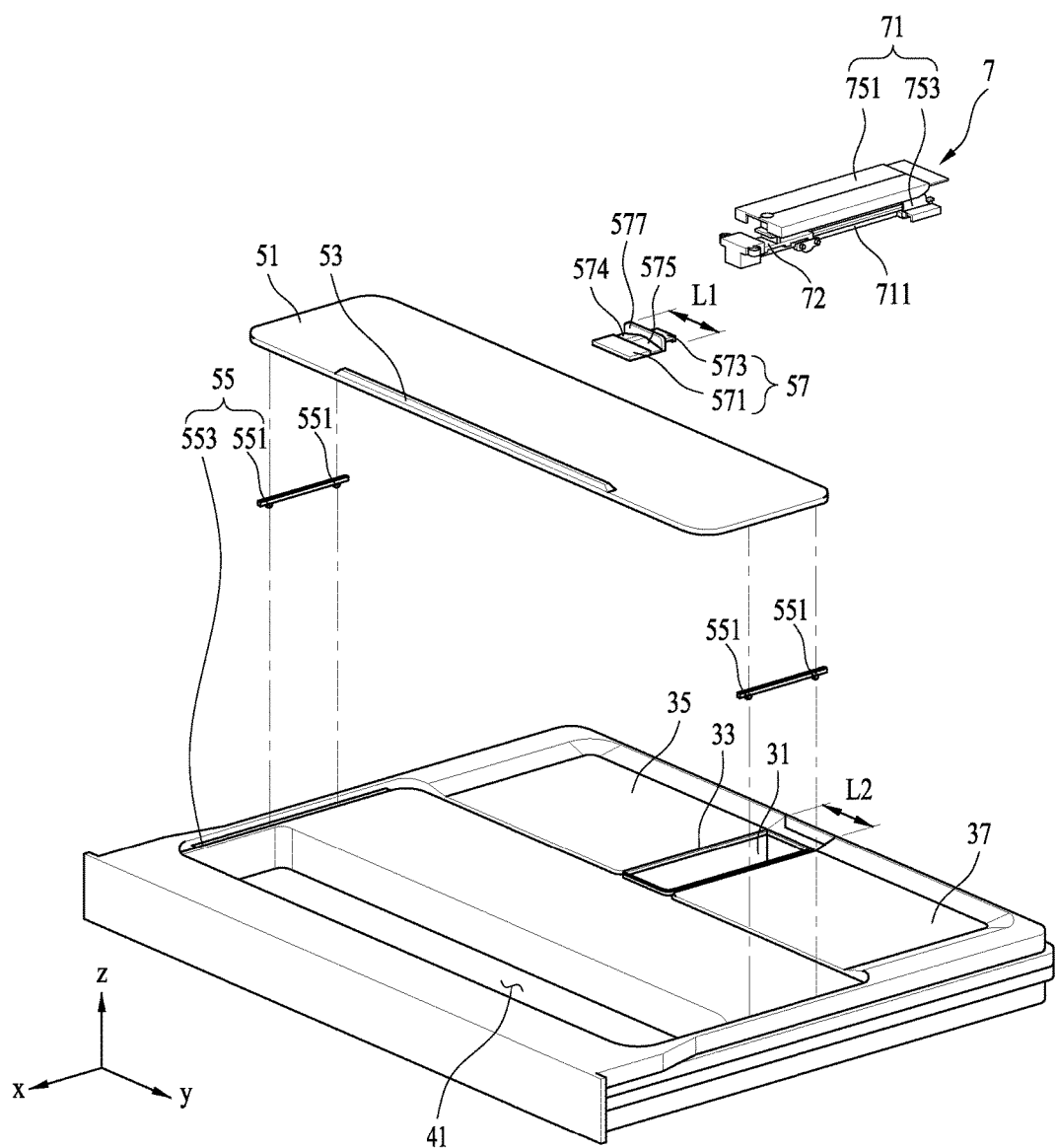
FIG. 4 is an exploded perspective view of the receiving unit.

As illustrated in FIG. 4, an embodiment of the present invention may further include a transfer unit 7 (or transfer assembly, slide assembly), which not only controls the moving speed of the door body 51 but also provides restoring force required to move the door body 51 to the initial position (the position shown in FIG. 2) when the door body 51 opens the introduction port 41.

In order to mount the receiving unit P without reducing the storage spaces in the storage compartments 11 and 13, the transfer unit 7 may be received in a transfer-unit recess 31 (or slide recess), which is formed by depressing the receiver body 3 toward the second space 13. The transfer-unit recess 31 may be formed in the direction of movement of the door body 51 (the depth direction of the first space, that is, the x-axis direction).

The door body 51 may be connected to the transfer unit 7 via a connector 57. As illustrated in FIG. 4, the connector 57 may include a connector body 571 secured to the door body 51 and a slider coupler 573 provided at the connector body 571 and connected to the transfer unit 7.

Figure 5:
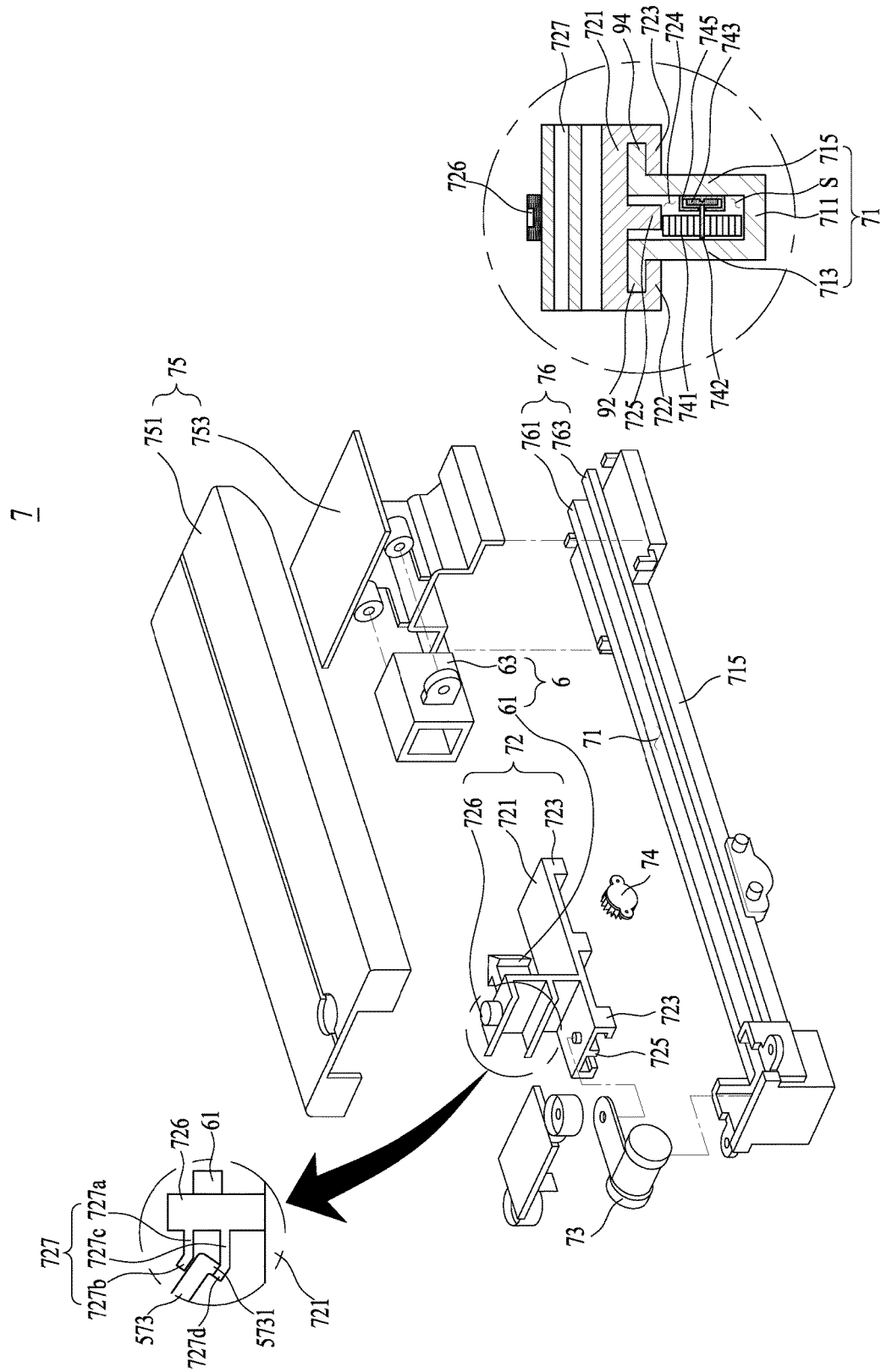
FIG. 5 illustrates an example of a transfer unit provided in the receiving unit.

As illustrated in FIG. 5, the transfer unit may include a transfer-unit body 71 disposed in the transfer-unit recess 31, a transfer space S provided in the transfer-unit body 71 in a direction parallel to the direction of movement of the door body 51, a slider capable of moving along the transfer space, an elastic-force provider for providing the door body 51 with restoring force when the door body 51 is moved in order to open the introduction port 41, and a speed controller 74 (or speed dampener) for reducing the speed of the door body 51 when the door body 51 is moved to close the introduction port 41.

The transfer space S may be defined by a base 711 secured in the transfer-unit recess 31, and a first side wall 713 and a second side wall 715, which are respectively provided at opposite sides of a surface of the base 711 parallel to the door body 31.

The slider 72 may include a slider body 721 capable of reciprocating along the transfer space S and a door coupler 727 for connecting the slider body 721 to the slider coupler 753.

The slider body 721 is coupled to slider guides 92 and 94, provided at the transfer-unit body 71, by means of a first coupler 722 and a second coupler 723. The slider guides may include a first guide 92 provided at the first side wall 713 and a second guide 94 extending from the second side wall 715. The first guide 92 may extend away from the transfer space S, and the second guide 94 may also extend away from the transfer space S.

The first coupler 722 is shaped so as to couple the slider body 721, which is positioned above the transfer space S, to the first guide 92, and the second coupler 723 is shaped so as to couple the slider body 721 to the second guide 94.

FIG. 5 illustrates an example in which the first coupler 722 extends from the bottom surface of the slider body 721 and is then bent toward the first guide 92 and the second coupler 723 extends from the bottom surface of the slider body 721 and is then bent toward the second guide 94. Accordingly, the slider body 721 is able to reliably move in a direction parallel to the direction of movement of the door body 51.

In the case in which the door body 51 is removably provided at the slider body 721, the door coupler 727 may include a first rib 727a and a second rib 727c, which extend toward the door body 51 from the slider body 721 and which are spaced apart from each other by a predetermined distance in the height direction of the slider body (the z-axis direction). The slider coupler 573 may be fitted into the space defined between the first rib 727a and the second rib 727c.

The slider body 721 is moved in the anterior direction of the transfer space S when a user pushes the door body 51 rearwards, and the door body 51, positioned in the rear of the first space, is moved in the posterior direction of the first storage compartment 11 when the elastic-force provider 73 provides the slider body 721 with restoring force. Accordingly, the transfer unit 7 is able to control the movement of the door body 51 by means of only the slider coupler 573 and the door coupler 727.

However, in the transfer unit 7 having only the above-described structure, the slider coupler 573 may be separated from the door coupler 727 when a user pulls the door body 51 in the anterior direction of the first storage compartment 11. In order to prevent the above problem, the slider coupler 573 may further be provided with a hook 5731, which is bent toward the second rib 727c, and the second rib 727c may further be provided with a second bent portion 727d, which is bent away from the slider body 721.

The second bent portion 727d may be bent at an obtuse angle rather than being bent so as to be perpendicular to the second rib. When there is a need for cleaning or repair of the door body 51, the door body 51 has to be separated from the slider 72. In the case in which the second bent portion 727d is bent to be perpendicular to the second rib 727c, in order to separate the door body 51 from the slider 72, a user must lift the door body 51 in the z-axis direction to a height such that the free end of the hook 5731 does not interfere with the free end of the second bent portion 727d. In this case, if the space above the receiving unit P is insufficient because the drawer or the shelf is positioned above the receiving unit P, it is difficult to separate the door body 51. Accordingly, the second bent portion 727d may be bent at an acute obtuse angle with respect to the second rib 727c.

When the second bent portion 727d is bent at an obtuse angle with respect to the second rib 727c, a user may separate the door body 51 from the slider 72 simply by slightly rotating the door body 51 about the hook 5731 and then pulling the door body 51 in the anterior direction of the first space (the x-axis direction).

In order to limit the rotational angle of the door body 51 when the door body 51 is rotated about the hook 5731, the first rib 727a may further include a first bent portion 727b, which is bent at the same angle as the second bent portion 727d.

In order to minimize the space required to mount the receiving unit P, the receiving unit P has to be provided on the upper surface of the partition wall 15 and the drawer or the shelf has to be disposed above and close to the partition wall 15. Accordingly, the smaller the bent angles of the first and second bent portions are, the better, as long as the slider coupler 573 is not separated from the door coupler 727 when the door body 51 is pulled toward the first open surface.

The elastic-force provider may be configured to have any shape capable of providing the restoring force required to restore the door body 51, which is positioned so as to open the introduction port 41, toward the introduction port 41.

Figure 6:
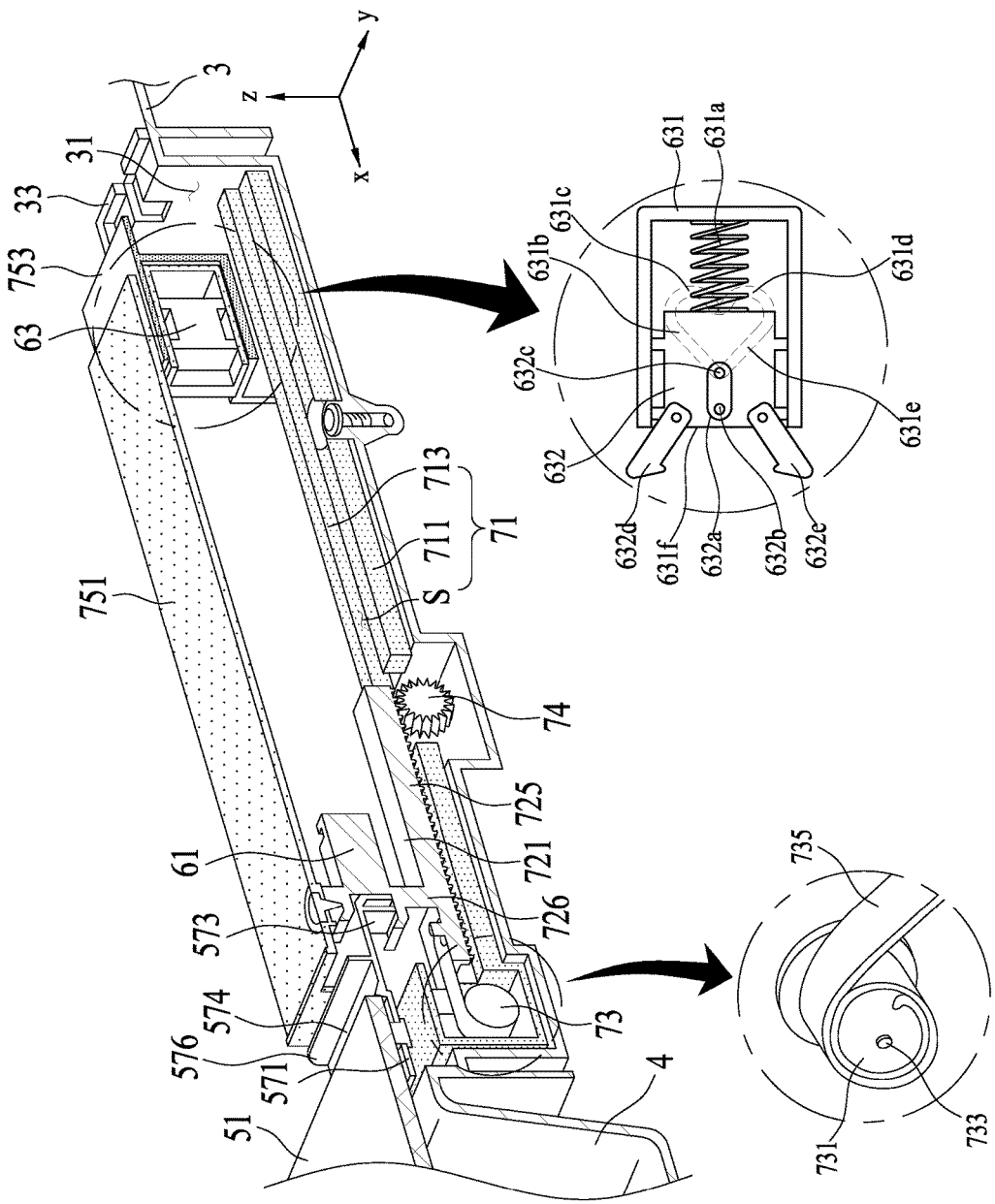
FIG. 6 illustrates the transfer unit when the receiver door closes a receiver.

The elastic-force provider 73 (or elastic force assembly, spring assembly) may be composed of a tension spring, which is secured at one end thereof to the transfer-unit body 71 and at the other end thereof to the slider body 721, or may be composed of the spring shown in FIG. 6 (a constant-torque spring, a constant-force spring or a spiral spring).

Figure 7:
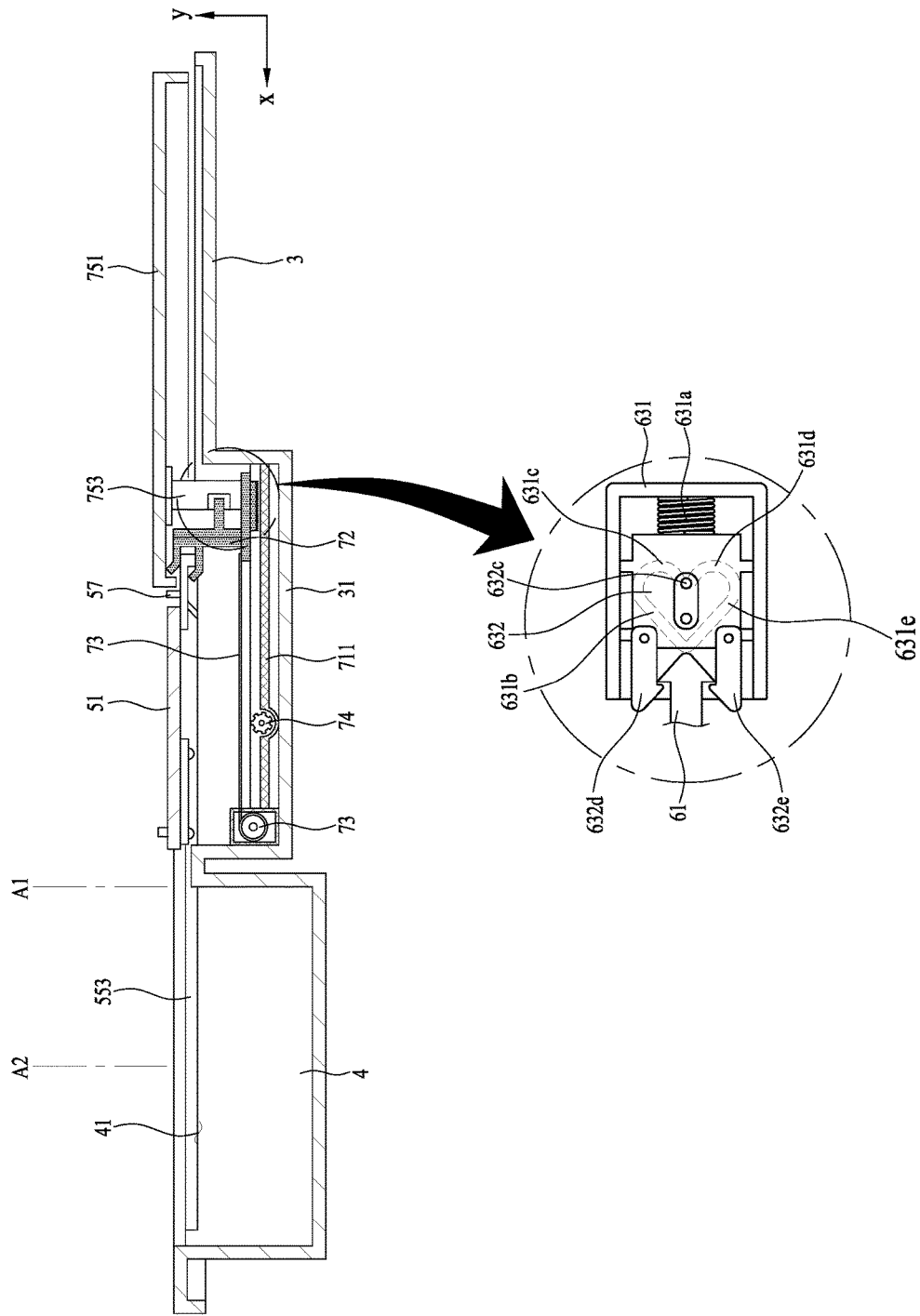
FIG. 7 illustrates the transfer unit in which the receiver door opens the receiver.
Figure 8:
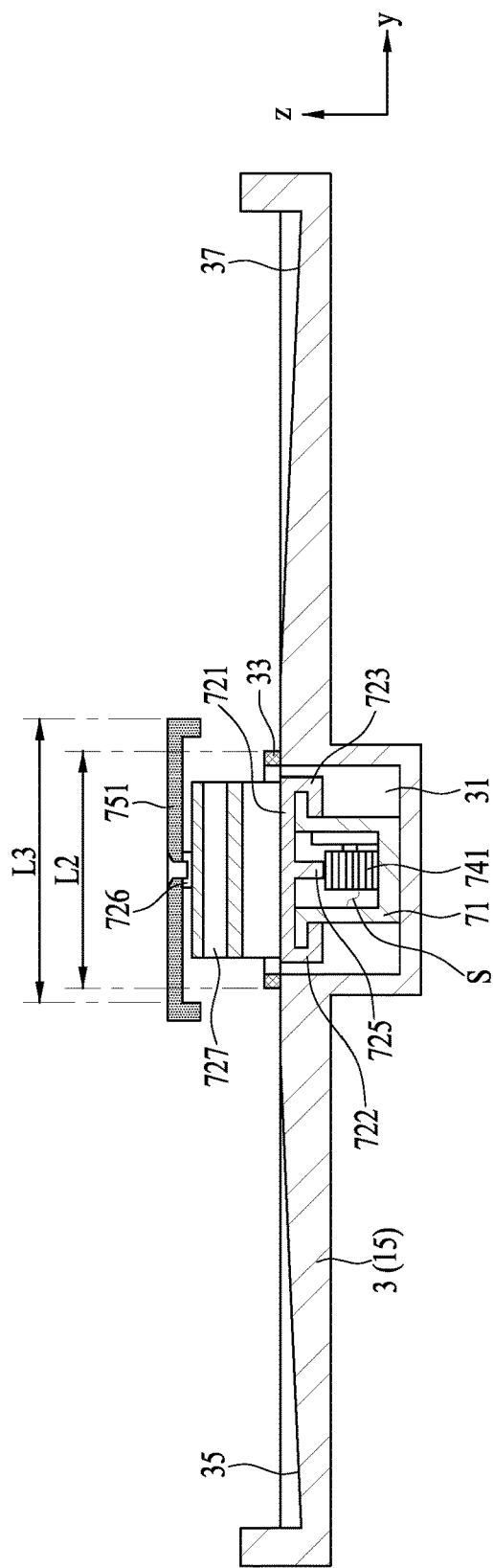
FIG. 8 is a cross-sectional view of a partition wall and the transfer unit.

The elastic-force provider 73 shown in FIG. 7, which is characterized in that it enables the slider body 72 to be moved in the anterior direction of the transfer space S at an almost constant speed, may include a spool 731 rotatably coupled to the transfer-unit body 71 via a spool-rotating shaft 733, and a metal strip, which is secured at one end thereof to the spool 731 and at the other end thereof to the slider body 721, and which is wound around the spool 731.

The speed controller 74 may be configured into any form capable of reducing the speed of motion of the slider body 721, which is moved in the anterior direction of the transfer space S (in the x-axis direction). In other words, the speed controller 74 may be composed of a damper constituted by a cylinder and a piston, or may be composed of the gear structure shown in FIG. 5.

Figure 10:
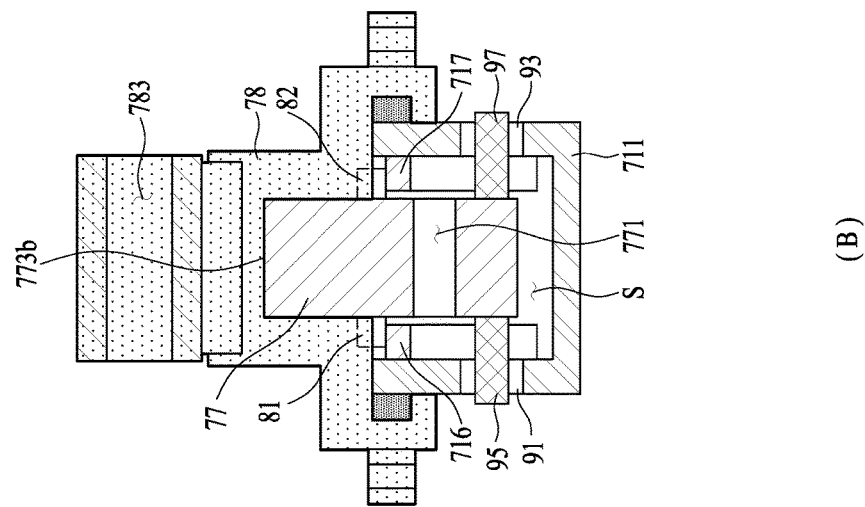
Figure 10:
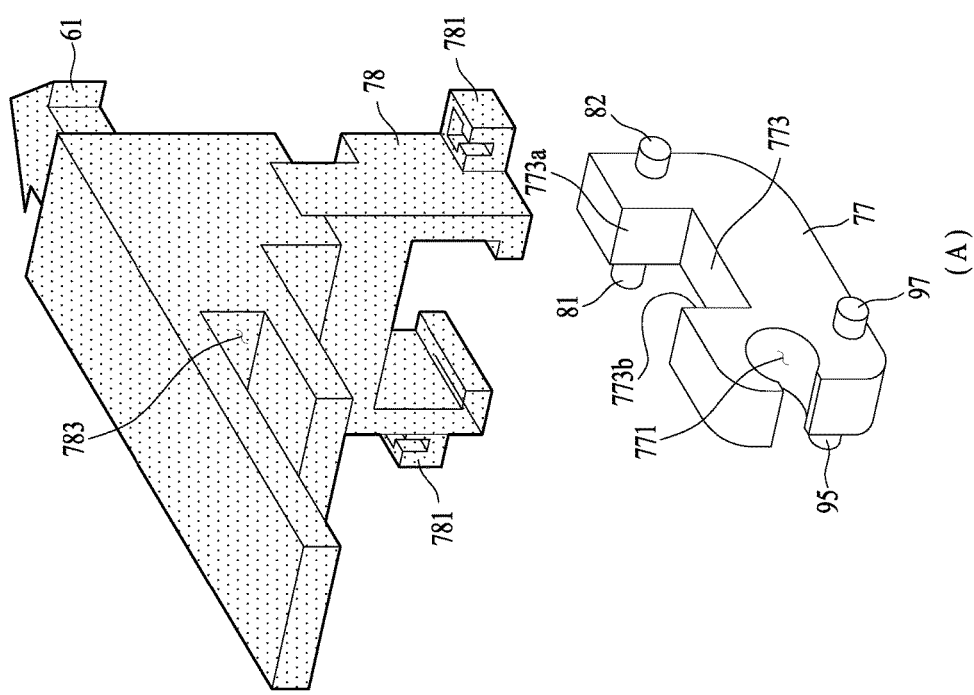

In the former case, the speed controller 74 may include a cylinder secured to the transfer-unit body 71, a piston, which is disposed at one end thereof in the cylinder and is secured at the free end thereof to the slider body 721, and a head secured to the one end of the piston and disposed in the cylinder (see FIG. 10). Since the head comes into frictional contact with the inner circumferential surface of the cylinder when the door body 51 is moved to close the introduction port 41, the speed controller 74, which is configured as described above, is able to prevent excessive increase in the speed of the door body 51.

If the restoring force provided to the door body 51 by the elastic-force provider 73 is excessive, there are risks of the door body 51 being damaged due to collision with the receiver body 3 and of a user's hand colliding with the door body 51. The speed controller 74 provides the solution for these problems.

The speed controller 74 shown in FIG. 7 may be engaged with a rack 725 formed on the slider body 721. The rack 725 is provided on the lower surface of the slider body 721 so as to be disposed in the transfer space S. In other words, the rack 725 may be disposed in a space 724 defined by the first coupler 722 and the second coupler 723.

In this case, the speed controller 74 may include a gear 741 that is engaged with the rack 725 and a resisting-force provider (or dampener) for providing resisting force for suppressing rotation of the gear 741.

The resisting-force provider may include a case 745, secured to the transfer-unit body 71 and containing a fluid therein, a rotator, rotatably disposed in the case, and a rotating shaft 742, which penetrates the case 745 so as to connect the gear 741 to the rotator 743.

The gear 741 may be engaged with the rack 725 between the point A1 (see FIG. 7) at which the door body 51 begins to close the introduction port 41 and the point A2 at which the introduction port 41 is closed by 50%.

Specifically, assuming that the drawer or the shelf is positioned above the receiving unit P, it is advantageous for the door body 51 to be quickly moved to the point A1 in terms of rapid closing of the introduction port 41. Here, even when the door body 51 is quickly moved to the point A1, none of the above-mentioned problems caused by the high speed of the door body 51 occur.

For this reason, the gear 741 may be engaged with the rack 725 in the range between the point at which the door body 51 closes the introduction port 41 by 50% or more and the point at which the door body 51 closes the introduction port 41 by 90%.

The receiving unit P according to an embodiment of the present invention may further include a position holder 6, capable of maintaining the state in which the door body 51 opens the introduction port 41.

The position holder 6 (or coupler) may include a coupling protrusion 61 (or hook), secured to one of the slider body 721 and the transfer-unit body 71, and a coupling grab 63 (or hook assembly), provided at the other of the slider body 721 and the transfer-unit body 71. FIG. 6 illustrates an example in which the coupling protrusion 61 is provided at the slider body 721 and the coupling grab 63 is provided at the transfer-unit body 71.

The coupling grab 63 may be configured to be repeatedly engaged with the coupling protrusion 61 (see FIG. 7) and released from the coupling protrusion 61 (see FIG. 6) whenever external force is applied to the coupling protrusion 61.

As illustrated in FIG. 6, the coupling grab may include a first coupling grab body 631, secured to the transfer-unit body 71, and a second coupling grab body 632, which is disposed in the first coupling grab body 631 so as to reciprocate therein and is removably engaged with the coupling protrusion 61.

The first coupling grab body 631 may include a fitting gate 631*f* into which the second coupling grab body 632 is fitted, a spring 631*a* for supplying elastic force to the second coupling grab body 632, and a plurality of moving path sections 631*b*, 631*c*, 631*d* and 631*e*, which constitute the moving path of the second coupling grab body 632.

The spring 631*a* serves to push the second coupling grab body 632 toward the fitting gate 631*f*.

The moving path of the second coupling grab body 632 may include a first path section 631*b*, which extends toward the bottom surface of the first coupling grab body 631 (in a direction away from the fitting gate) from the fitting gate 631*f*, a second path section 631*c*, extending toward the fitting gate 631*f* from one end of the first path section, a third path section 631*d*, extending toward the bottom surface of the first body 631 from the second path section, and a fourth path section 631*e*, extending toward the fitting gate 631*f* from the third path section 631*d* and connected to the other end of the first path section 631*b*.

Here, the second coupling grab body 632 may include a bar 632*a*, rotatably coupled to the second coupling grab body via a shaft 632*b*, a protrusion 632*c*, provided at the bar so as to be inserted into the path sections 631*b*, 631*c*, 631*d* and 631*e*, and a first bar 632*d* and a second bar 632*e*, which are rotatably coupled to the second coupling grab body 632 and are exposed to the outside of the first coupling grab body 631 through the fitting gate 631*f*.

Accordingly, when the door body 51 is moved in the posterior direction of the first space 11 (in the negative x-axis direction), the coupling protrusion 61 moves the second coupling grab body 632 toward the bottom surface of the first coupling grab body 631 by means of the slider body 721.

When the second coupling grab body 632 is pushed, the protrusion 632*c* is moved along the first path section 631*b* and the second path section 631*c* and is positioned at the connecting point (first point) between the second path section 631*c* and the third path section 631*d*, and the first bar 632*d* and the second bar 632*e* are rotated toward the coupling protrusion 61 while interfering with the fitting gate 631*f*. Consequently, when the protrusion 632*c* provided at the second coupling grab body is positioned at the first point, the coupling protrusion 61 is held on the second coupling grab body 632, and the door body 51 is maintained in the state of opening the introduction port 41.

In this state, when a user pushes the door body 51 toward the rear surface of the first space 11 once more, the coupling protrusion 61 pushes the second coupling grab body 632, and the protrusion 632*c* is thus moved to the connecting point (second point) between the fourth path section and the first path section 631*b* through the third path section 631*d* and the fourth path section 631*e* (see FIG. 6).

When the protrusion 632*c* provided at the second coupling grab body is positioned at the second point, the coupling protrusion 61 is released from the second coupling grab body 632. Accordingly, the slider body 721 is moved in the x-axis direction by means of the restoring force of the elastic-force provider 73, and the door body 51 thus closes the introduction port 41.

In the receiving unit P having the above-described structure, there is the potential for foreign substances to enter the transfer-unit recess 31. In order to prevent this, the receiving unit P according to the present invention may further include a cover 75 disposed above the transfer-unit recess 31.

Since the cover 75 is configured to be moved together with the slider 72, the cover 75 may be disposed above the transfer-unit recess 31 when the door body 51 closes the introduction port 41.

As illustrated in FIG. 7, the cover 75 may include a cover body 751 disposed above the transfer-unit recess 31 and a cover support 753 secured to the transfer-unit body 71 so as to support the lower surface of the cover body 751.

The cover body 751 may be secured to the slider 72 via a cover fixer 726 provided at the slider body. The cover support 753 has to be configured so as to be secured not to the cover body 751 but to the transfer-unit body 71. The reason for this is because the cover support 753 serves to support the cover body 751, which moves together with the slider body 721. In this case, the coupling grab 63 of the position holder may be secured to the cover support 753.

In order to prevent foreign substances from entering the transfer-unit recess 31 from above the transfer-unit recess 31, the transfer-unit recess 31 may be positioned in the area at which the cover body 751 projects toward the receiver body 3.

Specifically, when the center of the cover body 71 coincides with the center of the transfer-unit recess 31, the width of the cover body L3 (the length of the cover body in the y-axis direction) may be greater than the width of the transfer-unit recess 31 (the length of the transfer-unit recess in the y-axis direction), and the length of the cover body (the length of the cover body in the x-axis direction) may be greater than the length of the transfer-unit recess (the length of the transfer-unit recess in the x-axis direction).

Furthermore, in order to prevent foreign substances from entering the transfer-unit recess 31 from the lateral sides of the transfer-unit recess 31, the receiver body 3 may further include a blocking wall 33 surrounding the periphery of the transfer-unit recess 31. Here, the width L3 of the cover body may be greater than the width L2 of the blocking wall 33. The reason for this is because it is possible to prevent foreign substances from entering the transfer-unit recess 31 by guiding the foreign substances present above the cover body 751 toward the outside of the blocking wall 33.

In addition, the receiver body 3 may further include a first sloping surface 35, which is inclined downwards toward the peripheral edge of the receiver body 3 from one of opposite lateral side surfaces of the blocking wall 33 parallel to the direction of movement of the door body 51, and a second sloping surface, which is inclined downwards toward the peripheral edge of the receiver body 3 from the other of the opposite lateral surfaces of the blocking wall 33.

As illustrated in FIG. 7, since the connector 57 connecting the door body 51 to the slider body 721 passes over the transfer-unit recess 31 when the door body 51 is moved in order to open and close the introduction port 41, it is also necessary to provide the connector 57 with a blocking member for preventing foreign substances from entering the transfer-unit recess 31.

As illustrated in FIG. 4, the blocking member is positioned between the connector body 571 and the slider coupler 573 so as to guide foreign substances (liquid or solid substances) falling on the connector 57 toward the outside of the transfer-unit recess 31.

The blocking member may include a discharge guide 577, which is positioned between the connector body 571 and the slider coupler 573 so as to extend in the width direction of the transfer-unit recess 31 (in the y-axis direction), and connector sloping surfaces 574 and 575, positioned between the connector body 571 and the discharge guide 577.

The width L1 of the discharge guide 577 may be greater than the width L2 of the transfer-unit recess 31 or the blocking wall, and the connector sloping surfaces may be configured to guide foreign substances entering between the connector body 571 and the discharge guide 577 toward the outside of the blocking wall 33.

FIG. 4 illustrates an example in which the connector sloping surfaces include a first connector sloping surface 574, which is inclined downwards toward one lateral side from the center of the discharge guide 577, and a second connector sloping surface 575, which is inclined downwards toward the other lateral side from the center of the discharge guide 577.

In the receiving unit P, which is constructed as described above, if the distance by which one lateral side of the door body 51, which is parallel to the direction of movement of the receiver door 5, is moved is not equal to the distance by which the other lateral side of the door body 51, which is parallel to the direction of movement of the receiver door 5, is moved, there may be a problem in that the door body 51 cannot open and close the introduction port 41 or in that it takes considerable force to move the door body 51.

In order to solve the problem whereby the door body 51 is slanted while being moved along the upper surface of the receiver body 3, the receiving unit P according to the present invention may further include guides 55 for guiding the movement of the door body 51.

Each of the guides 55 may include rollers 551 rotatably coupled to the door body 51 and a roller groove 553 provided in the receiver body 3 so as to define the moving path of the rollers 551. The roller groove 553 may be formed by depressing the surface of the receiver body 3, and has to be parallel to the direction of movement of the receiver door 5 (the x-axis direction).

The guides 55 are disposed under opposite lateral ends of the door body 51, and the guides 55 do not spoil the design of the transparent door body 55. In other words, when a user looks into the receiver through the door body 55, the guides 55 do not obstruct his/her field of vision.

The guides 55 serves to perform only guidance of the anteroposterior movement of the door body 51, without providing elastic force or damping force to the door body 51.

Figure 9:
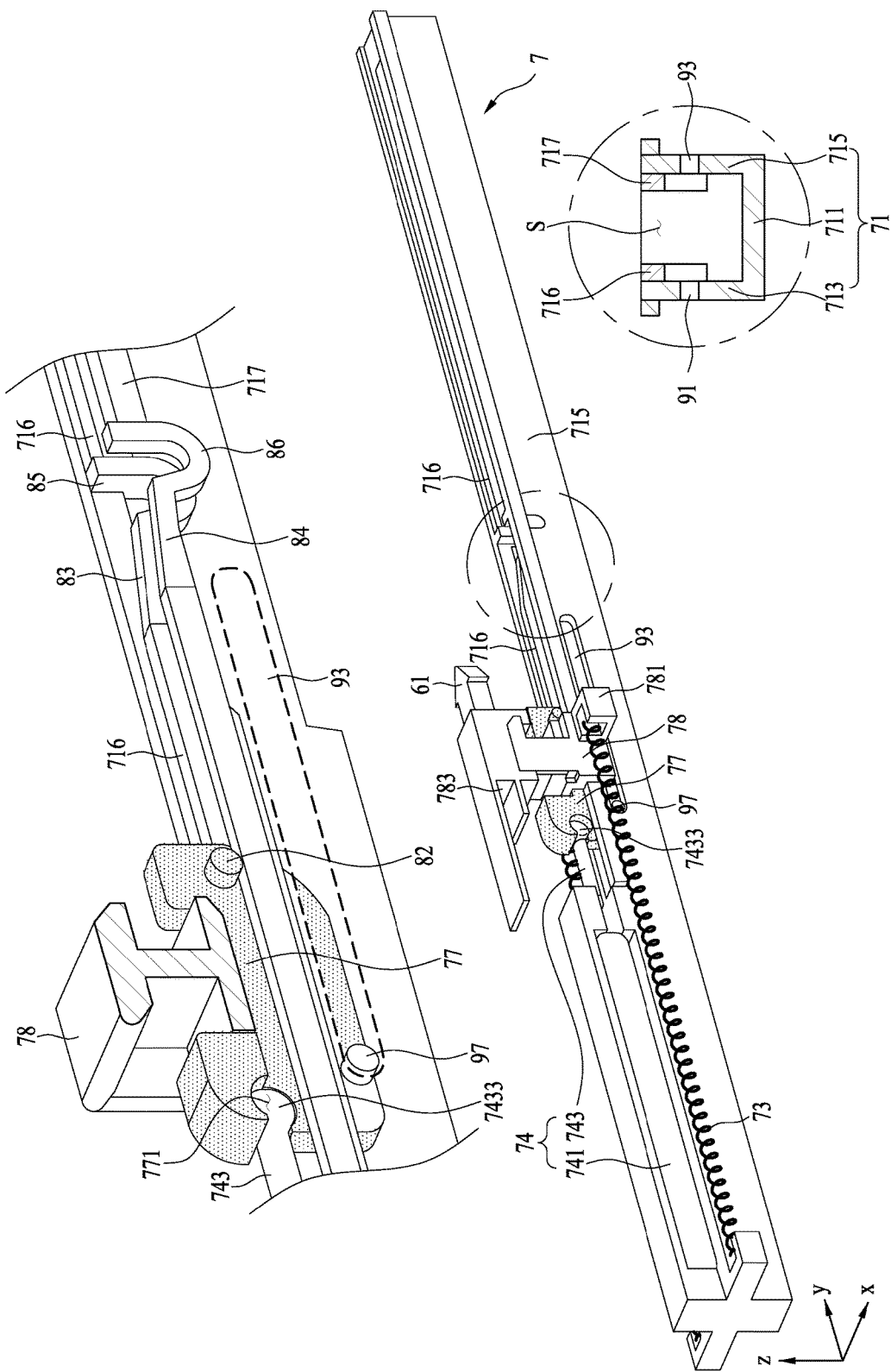
FIGS. 9 to 11 illustrate another example of the transfer unit.
Figure 11:
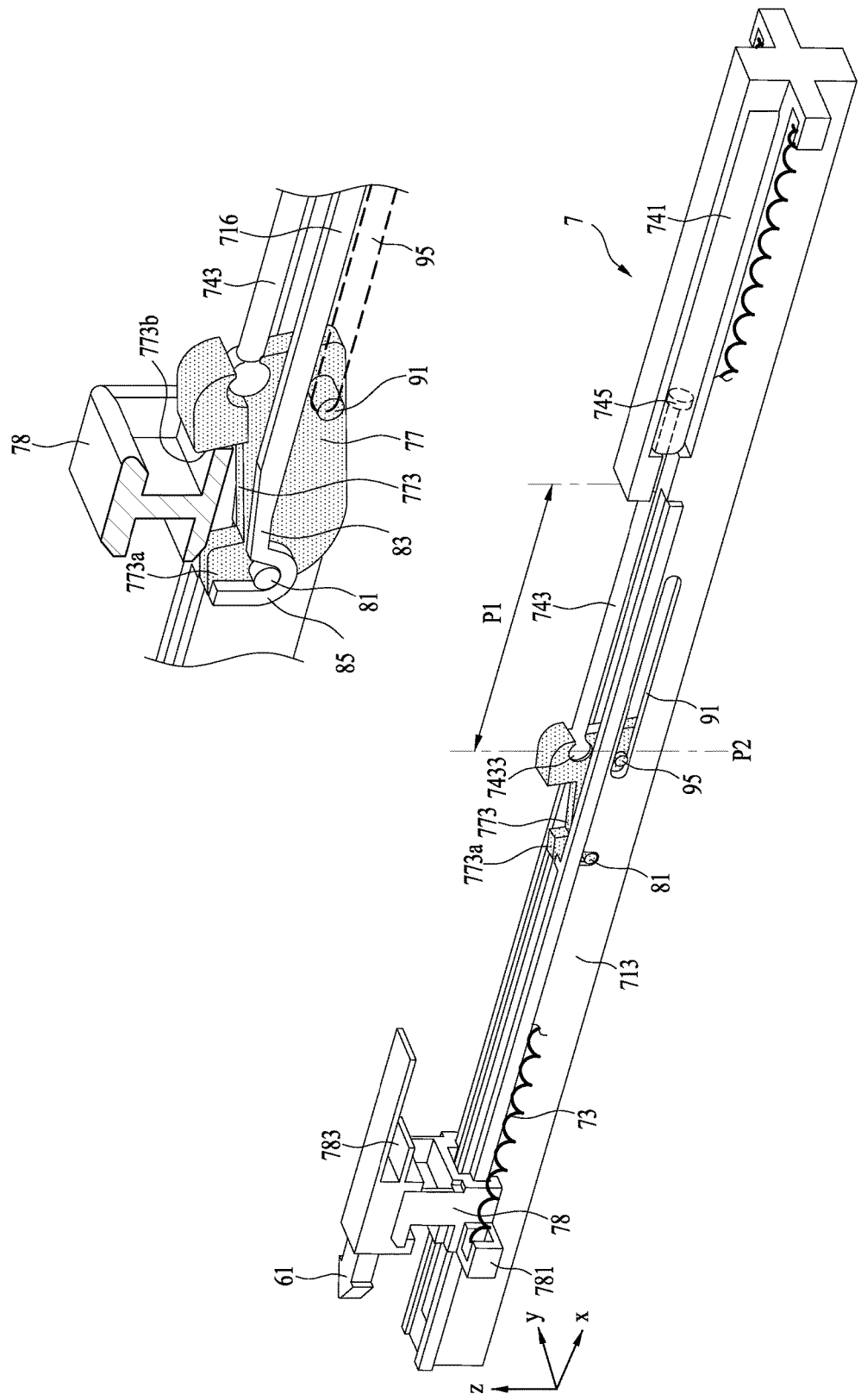

FIGS. 9 to 11 illustrate another embodiment of the transfer unit 7 provided at the receiving unit P.

This embodiment also includes the elastic-force provider 73 and the speed controller 74. As illustrated in FIG. 9, the elastic-force provider 73 may be composed of a spring, and the speed controller 74 may include a cylinder 741, and a piston 743, which is disposed at one end thereof in the cylinder by means of a head 745 (see FIG. 10) and is disposed at the free end 7433 thereof outside the cylinder.

The transfer unit 7 according to this embodiment may include a transfer-unit body 71 extending in a direction parallel to the direction of movement of the door body 51, a transfer space S provided in the transfer-unit body 71 so as to be parallel to the moving direction (the x-axis direction) of the door body 51, a first slider 77, which is movable in the transfer space and is connected to the free end 7433 of the piston, and a second slider 78, which is connected to the door body 51 and is secured to one end of the elastic-force provider 73. The second slider 78 is characterized by being separated from the first slider 77 depending on whether the free end 7433 of the piston passes over a predetermined reference point P2 (see FIG. 10).

The transfer-unit body 71 may include a base 711, secured in a transfer-unit recess 31 provided in the body, and a first side wall 713 and a second side wall 715, which are provided at opposite lateral ends of the base 711 parallel to the direction of movement of the door body 31. The transfer space S is defined by the base, the first side wall and the second side wall.

The transfer space S is provided therein with a first support 716 and a second support 717, which are spaced apart from each other by a predetermined distance so as to provide the moving path of the first slider 77. Here, the first slider 77 is positioned between the first support 716 and the second support 717, and is connected to the free end 7433 of the piston via a piston coupler 771.

As illustrated in FIG. 10, the first slider 77 may include a mount portion 773 in which the second slider 78 is received. The mount portion 773 may be defined by a first stopper 773a and a second stopper 773b, which are spaced apart from each other so as to receive the second slider 78.

The first stopper 773a may be defined as a stopper, which is positioned in a direction in which the second slider 78 is separated from the first slider 77, and the second stopper 773b may be defined as a stopper closer to the free end 7433 of the piston.

The second slider 78 may include a door coupler 783 coupled to the door body 51 and a spring coupler 781 secured to an end of the elastic-force provider 73. The door coupler 783 may be configured to have the structure shown in FIG. 4, and the cover body 571, which is positioned above the transfer-unit recess 31 so as to prevent foreign substances from entering the transfer-unit recess, may be secured to the second slider 78.

In this embodiment, the coupling protrusion 61 of the position holder, capable of maintaining the state in which the door body 51 opens the introduction port 41, may be provided at the second slider 78, and the coupling grab 63, with which the coupling protrusion 61 is engaged, may be secured to the transfer-unit body 71, the body 7 or the like.

In the transfer unit 7 having the above-described structure, the second slider 78 may be separated from the first slider 77 by means of height controllers 81, 82, 83, 84, 85 and 86.

As illustrated in FIG. 9, the height controllers may include a first projection 81 (see FIG. 11), which projects from the first slider 77 so as to cause the first slider 77 to be supported by the first support 716, a second projection 82, which projects from the first slider 77 so as to cause the first slider to be supported by the second support 717, a first receiving groove 85 formed at a position lower than the first support 716 so as to receive the first projection 81 therein, a second receiving groove 86 formed at a position lower than the second support 717 so as to receive the second projection 82 therein, a first sloped portion inclined downwards toward the first receiving groove from the first support 716, and a second sloped portion 84 inclined downwards toward the second receiving groove 86 from the second support 717.

As illustrated in FIG. 11, when the free end 7433 of the piston reaches the reference point P2, the height controllers move the first projection 81 and the second projection 82 to the first receiving groove 85 and the second receiving groove 86, thereby lowering the first stopper 773a to a position lower than the first support 716 and the second support 717.

Since the first stopper 773a is the stopper that is positioned in the direction in which the second slider 78 is separated from the first slider 77, when the first stopper 773a is moved to a position lower than the first support 716 and the second support 717, the second slider 78 is allowed to be separated from the mount portion 773 of the first slider.

Accordingly, when a user pushes the door body 51 in the posterior direction of the first space 11 (in the negative x-axis direction) such that the free end 7433 of the piston passes over the reference point P2, the door body 51 is able to move together with the second slider 78 until the coupling protrusion 61 is coupled to the coupling grab 63.

When the coupling protrusion 61 is separated from the coupling grab 63, the door body 51 is moved toward the first slider 77 by means of the second slider 78, which is connected to the elastic-force provider 73. At this time, the second slider 78 collides with the second stopper 773b provided at the first slider. Upon collision of the second slider with the second stopper, the first projection 81 and the second projection 82 are taken out of the first receiving groove 85 and the second receiving groove 86.

When the first projection 81 and the second projection 82 are taken out of the first receiving groove 85 and the second receiving groove 86, the second slider moves together with the first slider toward the introduction port 41. At this time, since the first slider 77 is connected to the speed controller 74, an excessive increase in the moving speed of the door body 51 is prevented.

The reference point P2 may be set to be a point in the moving range P1 of the free end 7433 of the piston. FIG. 10 illustrates an example in which the reference point P2 is set to be the limiting point of the moving range of the free end 7433 of the piston.

The reference point P2 may be set to be the position of the free end 7433 of the piston that is located between the point at which the door body 51 begins to close the introduction port 41 and the point at which the door body 51 closes the introduction port 41 by 50%.

Alternatively, the reference point P2 may be set to be the position of the free end 7433 of the piston that is located between the point at which the door body 51 closes the introduction port 41 by 50% or more and the point at which the door body 51 closes the introduction port 41 by 90%.

As illustrated in FIG. 10, the transfer unit 7 according to this embodiment may further include slider guides 91, 93, 95 and 97 configured to guide the movement of the first slider 77.

Specifically, the slider guides may include a first transfer groove 91, which is formed in the first side wall 713 of the transfer-unit body in the direction of movement of the door body 51, a second transfer groove 93, which is formed in the second side wall 715 in the direction of movement of the door body 51, a first protrusion 95, which projects from the first slider 77 and is fitted into the first transfer groove 91, and a second protrusion 97, which projects from the first slider 77 and is fitted into the second transfer groove 93.

In the above-described embodiments, the position holder 6 is positioned behind the receiver door 5. A portion of the position holder 6 may be positioned below the drawer 50 through the gap G. In other words, a portion of the position holder 6 may be positioned below the drawer 50 even when the receiver door 5 closes the introduction port 41.

When the receiver door 5 opens the introduction port 41, the receiver door 50 may be further moved through the gap G.

Accordingly, the position holder may be a structure, all of which is visible to a user or only a portion of which is visible to a user. When a user intuitively pushes the receiver door 5 rearwards, the movement of the receiver door 5 may be restricted at a certain moment. Subsequently, when a user intuitively pushes the receiver door 5 rearwards again, the movement of the receiver door 5 may be restricted.

By virtue of these characteristics, it is possible to prevent damage to the position holder 6. Furthermore, it is possible to prevent a reduction in storage space and deterioration of design due to the presence of the position holder 6. Particularly, when the receiver door 5 is made of a transparent material, it is possible to prevent deterioration in design of the receiver door 5 due to the presence of the position holder 6.

In the above-described embodiment, the transfer unit 7 may also be positioned behind the receiver door 5. Consequently, it is possible to reduce deterioration in the design and reduction in storage space due to presence of the transfer unit.

The present invention may be embodied so as to have various modifications, and the scope of rights thereof is not limited to the above embodiments. Accordingly, as long as the modifications thereof include the components disclosed in claims, it should be understood that such modifications are considered to fall within the scope of rights of the present invention.

INDUSTRIAL APPLICABILITY

The industrial applicability was described in the Best Mode.

The invention claimed is:

1. A refrigerator comprising:
a first storage compartment positioned at an upper side of a cabinet;
a second storage compartment positioned below the first storage compartment;
a partition wall provided to isolate the first storage compartment from the second storage compartment and to have an upper surface;
a third storage compartment provided in the partition wall, the third storage compartment having a storage space that is recessed downwards from the upper surface of the partition wall and having an opening formed on the upper surface to allow storage objects to be placed into the storage space;
a door provided to cover the opening of the third storage compartment and configured to be moved in a direction parallel to the upper surface of the partition wall to selectively open or close the opening;
an elastic-force assembly that applies a restoring force to the door when the door is moved to open the third storage compartment; and
a slide assembly that guides movement of the door, wherein the slide assembly includes:
a slide recess formed in the partition wall behind the storage space of the third storage compartment parallel to a direction of movement of the door; and
a cover provided above the slide recess that prevents foreign objects from entering the slide recess, the cover being configured to be anteroposteriorly moved together with the door.

2. The refrigerator according to claim 1, wherein the storage space of the third storage compartment is provided at a front side of the upper surface of the partition wall, and an anteroposterior length of the door is greater than an anteroposterior length of the opening such that the door covers an entire anteroposterior length of the opening.

3. The refrigerator according to claim 2, wherein the door is configured to be slidably moved in an anteroposterior direction on the upper surface of the partition wall, and an anteroposterior length of the door is less than an anteroposterior length of the first storage compartment.

4. The refrigerator according to claim 3, wherein a body of a fourth storage compartment is provided above a rear side of the opening separate from the storage space.

5. The refrigerator according to claim 4, wherein the door is configured to be moved rearwards through a vertical gap between the upper surface of the partition wall and the body of the fourth storage compartment.

6. The refrigerator according to claim 1, wherein the slide assembly includes a speed dampener that reduces a speed of the door when the door is moved to close the third storage compartment.

7. The refrigerator according to claim 1, wherein the slide assembly includes:
a slide assembly body secured to the partition wall and to one end of the elastic-force assembly;
a slide space provided in the slide assembly body parallel to a direction of movement of the door; and
a slider movably provided in the slide space, the slider being connected to the door and being secured to another end of the elastic-force assembly.

8. The refrigerator according to claim 7, wherein the slide assembly includes a rack provided at the slider, and a speed dampener that reduces a speed of the door and includes a gear rotatably secured to the slide assembly body and engaged with the rack, and a dampener that applies a resistive force to the gear upon rotation of the gear.

9. The refrigerator according to claim 7, wherein the elastic-force assembly includes:
a spool rotatably secured to the slide assembly body; and
a metal strip secured at one end to the spool and at another end to the slider, the metal strip being wound around the spool.

10. The refrigerator according to claim 7, wherein the cover is secured to the slider to be moved together with the slider, the cover being positioned above the slide recess when the door closes the third storage compartment.

11. The refrigerator according to claim 10, wherein the slide assembly includes:
a cover support secured to the slide assembly body to support a lower surface of the cover;
a coupling protrusion provided on the slider; and
a coupling grab provided on the cover support, the coupling protrusion being removably coupled to the coupling grab.

12. The refrigerator according to claim 10, wherein the slide recess is positioned in an area on the partition wall covered by the cover body.

13. The refrigerator according to claim 10, further comprising a blocking wall provided around a periphery of the slide recess to prevent foreign objects from entering the slide recess,
wherein a width of the cover is greater than a width of the blocking wall.

14. The refrigerator according to claim 13, further comprising a connector that connects the slide assembly to the door, the connector including:
a connector body coupled to the door;
a slider coupler provided on the connector body and removably coupled to the slider; and
a blocking member provided between the connector body and the slider coupler that prevents liquid from entering the slide recess.

15. The refrigerator according to claim 14, wherein the blocking member includes:
a discharge guide provided between the connector body and the slider coupler, the discharge guide having a width greater than a width of the blocking wall; and
a connector sloping surface that guides liquid introduced between the connector body and the discharge guide away from the blocking wall.

16. The refrigerator according to claim 14, further comprising:
a first sloping surface inclined downwards toward a peripheral edge of the partition wall from one lateral side of the blocking wall parallel to a direction of movement of the door; and
a second sloping surface inclined downwards toward a peripheral edge of the partition wall from an opposite lateral side of the blocking wall parallel to a direction of movement of the door.

17. A refrigerator comprising:
a first storage compartment positioned at an upper side of a cabinet;
a second storage compartment positioned below the first storage compartment;
a partition wall configured to isolate the first storage compartment from the second storage compartment and to have an upper surface;
a third storage compartment provided in the partition wall, the third storage compartment having a storage space that is recessed downwards from the upper surface of the partition wall and having an opening formed on the upper surface to allow storage objects to be placed into the storage space;

a door provided to cover the opening of the third storage compartment and configured to be moved in a direction parallel to the upper surface of the partition wall to selectively open or close the opening;

a slide recess depressed downwards from the upper surface of the partition wall behind the storage space;

a slide assembly provided in the slide recess to guide an anteroposterior movement of the door; and a cover disposed over the slide recess to cover the slide recess to prevent foreign objects from entering the slide recess, wherein the cover is configured to be anteroposteriorly moved together with the door.

18. The refrigerator according to claim 17, wherein the cover is positioned above the slide recess when the door closes the third storage compartment.

19. The refrigerator according to claim 17, wherein the cover and the door are positioned above the slide recess when the door opens the third storage compartment.

20. The refrigerator according to claim 17, wherein the slide assembly includes:

a slide assembly body secured to the partition wall, the slide recess being configured to receive the slide assembly;

a slide space provided in the slide assembly body parallel to a direction of movement of the door; and a slider movably provided in the slide space.

* * * * *